(12) United States Patent
Wentz

(10) Patent No.: US 11,240,040 B2
(45) Date of Patent: Feb. 1, 2022

(54) SYSTEMS, DEVICES, AND METHODS FOR RECORDING A DIGITALLY SIGNED ASSERTION USING AN AUTHORIZATION TOKEN

(71) Applicant: Ares Technologies, Inc., Cambridge, MA (US)

(72) Inventor: Christian T Wentz, Providence, RI (US)

(73) Assignee: Ares Technologies, Inc., Boston, MA (US)

(*) Notice: Subject to any disclaimer, the term of this patent is extended or adjusted under 35 U.S.C. 154(b) by 179 days.

(21) Appl. No.: 16/773,513

(22) Filed: Jan. 27, 2020

(65) Prior Publication Data

US 2020/0162268 A1 May 21, 2020

Related U.S. Application Data

(63) Continuation-in-part of application No. 16/597,405, filed on Oct. 9, 2019.

(60) Provisional application No. 62/743,132, filed on Oct. 9, 2018.

(51) Int. Cl.
*H04L 9/32* (2006.01)
*H04L 9/08* (2006.01)

(52) U.S. Cl.
CPC .......... *H04L 9/3247* (2013.01); *H04L 9/0816* (2013.01); *H04L 9/0861* (2013.01)

(58) Field of Classification Search
CPC ... H04L 9/3247; H04L 9/0816; H04L 9/0861; H04W 12/06; H04W 36/0038; H04W 12/068; H04W 12/71; G06F 16/90; G06F 21/45; G06F 21/606; G06F 21/62; G06F 2221/2149; G06F 21/60
See application file for complete search history.

(56) References Cited

U.S. PATENT DOCUMENTS

| 9,584,517 B1 * | 2/2017 | Roth ................... G06F 21/6209 |
| 10,002,362 B1 * | 6/2018 | Endress ................ H04L 9/3278 |
| 10,778,839 B1 * | 9/2020 | Newstadt .............. H04M 1/663 |

(Continued)

OTHER PUBLICATIONS

Kravitz et al., "Transaction Immutability and Reputation Traceability: Blockchain as a Platform for Access Controlled IoT and Human Interactivity," 2017 15th Annual Conference on Privacy, Security and Trust (PST) Year: 2017.*

(Continued)

*Primary Examiner* — Roderick Tolentino
(74) *Attorney, Agent, or Firm* — Caldwell Intellectual Property Law, LLC

(57) ABSTRACT

A method for importing a digitally signed assertion to a temporally sequential listing includes receiving, by an evaluating device, at least a communication including a first digitally signed assertion recorded, assigning, by the evaluating device, a confidence level to the first digitally signed assertion, authenticating, by the evaluating device, the first digitally signed assertion as a function of the confidence level, generating, by the evaluating device, a second digitally signed assertion as a function of the first digitally signed assertion, and entering, by the evaluating device, the second digitally signed assertion in at least an instance of a first temporally sequential listing.

18 Claims, 6 Drawing Sheets

(56) References Cited

U.S. PATENT DOCUMENTS

| | | | | |
|---|---|---|---|---|
| 2009/0271618 | A1* | 10/2009 | Camenisch | G06F 21/57 |
| | | | | 713/155 |
| 2014/0173274 | A1* | 6/2014 | Chen | G06F 21/64 |
| | | | | 713/155 |
| 2014/0366111 | A1* | 12/2014 | Sheller | G06F 21/31 |
| | | | | 726/7 |
| 2015/0128240 | A1* | 5/2015 | Richards | H04L 63/0861 |
| | | | | 726/7 |
| 2015/0256341 | A1* | 9/2015 | Ye | H04L 9/3234 |
| | | | | 713/164 |
| 2017/0178237 | A1* | 6/2017 | Wong | G06Q 20/12 |
| 2017/0249464 | A1* | 8/2017 | Maximov | G06F 21/57 |
| 2018/0034642 | A1* | 2/2018 | Kaehler | H04L 9/3247 |
| 2018/0089655 | A1* | 3/2018 | McDonald | G06Q 20/065 |
| 2018/0285810 | A1* | 10/2018 | Ramachandran | G06F 16/27 |

OTHER PUBLICATIONS

Chakravarty et al., "Blockchain-enhanced Identities for Secure Interaction," 2018 IEEE International Symposium on Technologies for Homeland Security (HST) Year: 2018.*

* cited by examiner

SYSTEMS, DEVICES, AND METHODS FOR RECORDING A DIGITALLY SIGNED ASSERTION USING AN AUTHORIZATION TOKEN

CROSS-REFERENCE TO RELATED APPLICATIONS

This application is a continuation in part of U.S. Nonprovisional application Ser. No. 16/597,405, filed on Oct. 9, 2019 and entitled "SYSTEMS, DEVICES, AND METHODS FOR RECORDING A DIGITALLY SIGNED ASSERTION USING AN AUTHORIZATION TOKEN," which claims the benefit of priority of U.S. Provisional Patent Application Ser. No. 62/743,132, filed on Oct. 9, 2018, and titled "SYSTEMS, DEVICES, AND METHODS FOR RECORDING A DIGITALLY SIGNED ASSERTION USING A SECURE COMPUTING MODULE." Each of U.S. Nonprovisional application Ser. No. 16/597,405 and U.S. Provisional Patent Application Ser. No. 62/743,132 is incorporated by reference herein in its entirety.

FIELD OF THE INVENTION

The present invention generally relates to the field of data storage and authentication in distributed computing systems. In particular, the present invention is directed to recording a digitally signed assertion using an authorization token.

BACKGROUND

Distributed ledgers and related data storage techniques, such as block chain technology, have greatly improved the ability to track transactions and other data securely in a transparent and readily verifiable manner. Block chain technology, however, remains limited in its usefulness because of its inherently extensive demands on computing power; verification of chains of transactions via hashing and public key cryptographic algorithms, and creation of new entries on such chains by similar processes, uses many computing clock cycles, which in turn results in costly degrees of consumption of energy and sometimes in lengthy wait times. Solutions thus far have implicitly proposed trade-offs between security and efficiency, for instance by using expedited processes that review portions of chains on a heuristic basis, skipping or deferring until later the review of entire chains to ensure the integrity of the process. The high degree of certainty required for the ledgers, however, means that such tradeoffs are not optimal, and generally must be supplemented with the same expensive processes originally used.

SUMMARY OF THE DISCLOSURE

In an aspect, a method for importing a digitally signed assertion to a temporally sequential listing includes receiving, by an evaluating device, at least a communication including a first digitally signed assertion recorded in a Second temporally sequential listing. The method includes assigning, by the evaluating device, a confidence level to the first digitally signed assertion. The method includes authenticating, by the evaluating device, the first digitally signed assertion as a function of the confidence level. The method includes generating, by the evaluating device, a second digitally signed assertion as a function of the first digitally signed assertion. The method includes entering, by the evaluating device, the second digitally signed assertion in at least an instance of a first temporally sequential listing.

In another aspect, a system for importing a digitally signed assertion to a temporally sequential listing includes an evaluating device communicatively connected to a network, wherein the evaluating device is designed and configured to receive at least a communication including a first digitally signed assertion recorded in a Second temporally sequential listing, assign a confidence level to the first digitally signed assertion, authenticate the first digitally signed assertion as a function of the confidence level, generate a second digitally signed assertion as a function of the first digitally signed assertion, and enter the second digitally signed assertion in at least an instance of a first temporally sequential listing These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
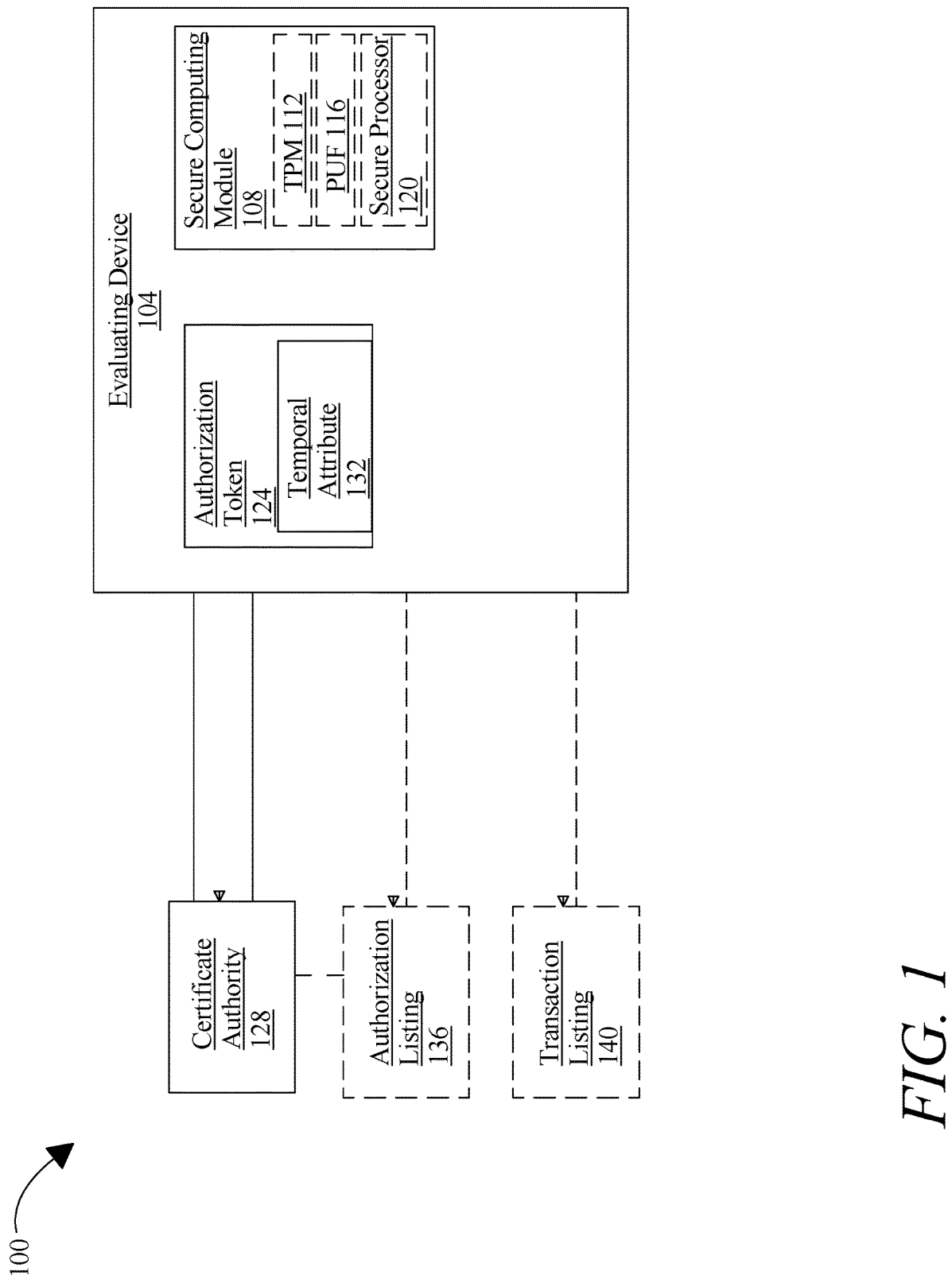
FIG. 1 is a block diagram illustrating a system for recording a digitally signed assertion using an authorization token.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to improvements to architecture and processes for authentication of digitally signed assertions and files containing digitally signed assertions, including cryptographic immutable ledgers, such as block chains or the like. In an embodiment, methods for selecting evaluators, which may be members of a network sharing or accessing an immutable ledger, may include selection of a subset of possible evaluators to perform a more rapid authentication process than that presented by a purely consensus-based approach. Selection of evaluators to perform authentication may include identifying evaluators having proximity to a querying device so that authentication may occur more rapidly, as well as identifying evaluators that may be trusted according to one or more protocols for determining levels of trust.

Aspects of the present disclosure may further be directed to improvements to architecture and processes for authenticating and importing digitally signed assertions from a first distributed network, or a first block chain, to a second distributed network, or second block chain. Use of trusted hardware and trusted technology, which may be hardware on a single computing system or a member of a shared network, to carry out these processes may enable rapid authentication of transactions in these distributed networks and for sharing and importing of information between distributed networks.

Systems and methods as described herein may involve computation, calculation, assessment, assignment, or use of a confidence level associated with one or more processes, devices, or data, including without limitation one or more processes, appraisals, and/or cryptographic evaluators as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Some embodiments of the disclosed systems and methods involve creation and/or evaluation of digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, a proof may not be a secure proof; in other words, a proof may include a one-time revelation of a secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Provisional Application No. 62/815,493, filed on Mar. 8, 2019, and entitled "METHODS AND SYSTEMS FOR IMPLEMENTING AN ANONYMIZED ATTESTATION CHAIN," the entirety of which is incorporated herein by reference. A digital signature may have a property of delegatability, as defined and/or described in Provisional Application No. 62/815,493.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Certificate authority may be implemented in a number of ways, including without limitation as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Provisional Application No. 62/758,367.

Turning now to FIG. 1, an exemplary embodiment of a system 100 for recording a digitally signed assertion using a secure computing module 108 is illustrated. System 100 includes an evaluating device 104. Evaluating device 104 may include a computing device or set of computing devices as described below in reference to FIG. 4, including without limitation any device and/or combination of devices suitable for use as a cryptographic evaluator. Evaluating device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Evaluating device 104 may include a single computing device operating independently, or may include two or more computing device operating in concert, in parallel, sequentially or the like; two or more computing devices may be included together in a single computing device or in two or more computing devices. Evaluating device 104 may interface or communicate with one or more additional devices as described below in further detail via a network interface device. Network interface device may be utilized for connecting evaluating device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Evaluating device 104 may include but is not limited to, for example, a computing device or cluster of computing devices in a first location and a second computing device or cluster of computing devices in a second location. Evaluating device 104 may include one or more computing devices dedicated to data storage, security, distribution of traffic for load balancing, and the like. Evaluating device 104 may distribute one or more computing tasks as described below across a plurality of computing devices of computing device, which may operate in parallel, in series, redundantly, or in any other manner used for distribution of tasks or memory between computing devices. Evaluating device 104 may be implemented using a "shared nothing" architecture in which data is cached at the worker, in an embodiment, this may enable scalability of system 100 and/or Evaluating device 104.

Continuing to refer to FIG. 1, evaluating device 104 may be designed and/or configured to perform any method, method step, or sequence of method steps in any embodiment described in this disclosure, in any order and with any degree of repetition. For instance, Evaluating device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Evaluating device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in an embodiment, a non-transitory computer-readable medium may contain and/or store instructions to perform any method, method step, or sequence of method steps in any embodiment described in this disclosure, in any order and with any degree of repetition, that evaluating device 104 may be configured to perform.

With continued reference to FIG. 1, evaluating device 104 may include a secure computing module 108. As used herein, a secure computing module 108 is a hardware element configured to perform one or more secured operations beyond the control of other circuit elements or software, whether incorporated with the secure computing module 108 in a circuit or computing device, or a part of an extrinsic computing device. As a result, at least one secured operation performed by secure computing module 108 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 108 and/or a system or computing device incorporating secure computing module 108 based on the above-described set of assumptions. As a non-limiting, example, a secure computing module 108 designed to produce an expected result despite all software-only attacks may give rise to a first confidence level, whereas another secure computing module 108 designed to produce its expected result in the face of all software or hardware attacks may give rise to a second confidence level; the second confidence level may be higher, owing to the reduced probability that the second secure computing module 108 would be compromised.

Still viewing FIG. 1, secure computing module 108 may include a trusted platform module (TPM 112). In an embodiment, a TPM 112 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 112 may have any suitable elements of digital or analog circuitry usable to perform one or more processes as described herein, including without limitation processes used to determine confidence levels and/or authenticate digitally signed assertions as described below. TPM 112 may have memory and/or other logic and/or a processor in its own right which may be in a non-limiting example a crypto-processor. TPM 112 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 108 may include at least PUF 116. PUF 116 may be implemented by various means. In an embodiment, PUF 116 includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photo-diodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate module-specific secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 116 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 116 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 116 in an embodiment include without limitation buskeeper PUFs, which may be similar to other PUFs based on bistable memory elements but leveraging buskeeper cells. PUF 116 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF 116 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 116 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atone dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 116 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 116 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer, Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 116 that may be used may include, without limitation, Nano-electro-mechanical (NEM) PUFs. NEM PUFs may include PUB that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 116 and/or TPM 112; such outputs may be used to generate symmetric or asymmetric keys, private keys, zero-knowledge proofs, or other proofs of authenticity, as described in further detail below. Such key generation may be performed by a private key generator. Private key generator may include, without limitation, a fuzzy extractor, such as those used to convert slightly variable signals from biometric samples or the like predictably into keys by having certain variation tolerances in the binary encoding process. Private key extraction/generation may utilize additional corrective measures, including as a nonlimiting example machine learning, neural networks, convolutional neural networks and the like, or other approaches to provide error correction over the operating temperature range of the device, to ensure consistency in key extraction.

In an embodiment, in place of PUF 116, the device may incorporate a strong private key generator, which may be incorporated at time of manufacture in a trusted facility using a random number generator operating in trusted hardware. In this fashion, the device functionally delivers the same private key in a challenge/response paradigm but is directly written instead of utilizing the variety of disorder based key mechanisms described above. Private key generation may, as a non-limiting example, incorporate true random number generator(s) (TRNGs), pseudorandom number generators (PRNGs) and/or related devices. Private key extraction or generation may be performed as described in further detail below in reference to FIG. 3.

Continuing to refer to FIG. 1, secure computing module 108 may implement one or more secure memory storage protocols. One or more secure memory storage protocols may be protocols designed to prevent unauthorized access to memory and/or to protect secure computing module 108 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 108. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 108 may incorporate a memory controller located within the trusted computing boundary to encrypt and authenticate by secret key memory elements such as without limitation memory page tables and/or memory pages accessible by other software elements, such as an operating system. Various techniques, processes, means or elements may be used to implement the above-described secure memory protocols. For instance, secure computing module 108 may use hardware-enabled access control to protect memory access; hardware access control may, as a non-limiting example, be performed by tagging each memory entry with a "container identifier" corresponding to a page, file, or other grouping of memory, enabling secure computing module 108 to determine whether tampering has occurred.

Secure computing module 108 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 108 may operate using one or more dedicated memory objects, registers, or storage elements; as a non-limiting example, secure computing module 108 may operate with dedicated cache lines not available to other processes or circuits, preventing, e.g., stack or buffer overrun attacks to corrupt or steal data. Dedicated memory elements may be wired only to secure computing module 108; access to dedicated memory elements may be rendered impossible except by way of secure computing module 108. Secure computing module 108 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described above, including without limitation blockchains and the like. Secure computing module 108 may utilize oblivious random access memory (RAM) wherein memory access patterns are obfuscate to prevent detection of memory access patterns by outside observers attempting to deduce execution details regarding processes performed using secure computing module 108 Secure computing module 108 and/or device incorporating secure computing module 108 may incorporate a trusted non-volatile storage device that provides some means of verification of secure storage capability and other properties. Memory protocols as described above may be used to implement methods of attested storage and the chain of trust beginning at PUF 116 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 108.

Still referring to FIG. 1, secure computing module 108 may include a secure processor. Secure processor may be a processor as described in this disclosure. Secure processor may operate autonomously from other processors and/or an operating system operating on at least a evaluating device 104; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM 112, to frustrate alteration and/or probing to discover and/or alter private keys. Private keys may be demonstrable as uniquely associated with secure processor by use of PUF 116 as described above; secure processor may include, for instance, a TPM 112 as described above. Alternatively or additionally, a certificate authority as described above, which may include without limitation a manufacturer of secure processor, may verify that one or more public keys are associated uniquely with secure processor according to any protocol suitable for digital certificates.

With continued reference to FIG. 1, secure computing module 108 may implement one or more methods of attested computation. Attested computation may include or involve one or more methods to ensure that computation of a program, known as an attested program, is trusted and signed by secure computing module 108 and/or computing device incorporating secure computing module 108; this may be supported by means to assert the state of the system memory, code, and input data. In an embodiment, secure computing module 108 and/or a computing device incorporating secure computing module 108 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 108 and/or computing device incorporating secure computing module 108 may append a cryptographic signature based upon any private key that may be associated with secure computing module 108 as described herein. Secure computing module 108 and/or computing device incorporating secure computing module 108 may operate a security reset of working memory prior to load of data for trusted computation; for instance, the secure computing module 108 and/or computing device incorporating secure computing module 108 may append a hash of the memory to cryptographic hash of system state following reset and prior to loading data. Secure computing module 108 and/or computing device incorporating secure computing module 108 may append its authentication signature of memory page tables and/or memory tables. Upon completion of the trusted computation, which may include execution of program code of system state, secure computing module 108 and/or computing device incorporating secure computing module 108 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 108. Secure computing module 108 and/or computing device incorporating secure computing module 108 may include a system to compute one or more hash trees of cryptographic hash of the computation, system state, and/or outputs; secure computing module 108 and/or computing device incorporating secure computing module 108 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination. Attested computation may be implemented, without limitation, as described in Provisional Application No. 62/815,493 and/or as described in Provisional Application No. 62/758,367.

Still referring to FIG. 1, examples of secure computing modules may include, without limitation, a TPM 112 as described above. Secure computing module 108 may include a TPM 112 combined with a boot-measuring protocol using hash trees, Merkle trees, or the like to measure boot entries to create an "attested boot." Secure computing module 108 may include a trusted execution technology (TXT) module combining TPM 112 with establishment of a secure container at run-time; secure container may be isolated from a software stack and OS of at least a temporal attester 104 and/or use TPM 112 to measure and attest to secure container prior to launch. Secure computing module 108 may include execute-only memory (XOM). Secure computing module 108 may include an Aegis processor. Secure computing module 108 may include a Bastion processor. Secure computing module 108 may include a trusted execution environment (TEE) or enclave, such as that enabled by SOFTWARE GUARD EXTENSIONS (SGX) system as promulgated by Intel Corporation of Santa Clara, Calif. Secure computing module 108 may include a Sanctum processor based on RISC V architecture. Secure computing module 108 may include an Ascend secure infrastructure. Secure computing module 108 may include a Ghostrider secure infrastructure. Secure computing module 108 may include an ARM TrustZone. Secure computing module 108 may include a Trusted Little Kernel (TLK) as promulgated by Nvidia Corporation of Santa Clara, Calif. Secure computing module 108 may include Secure Encrypted Virtualization (SEV) as promulgated by Advanced Micro Devices, Inc. of Santa Clara, Calif. Persons skilled in the art, upon reviewing the entirety of this disclosure, will be aware of various additional or alternative trusted computing processes that may be used to implement secure computing module 108 as disclosed herein. System 100 may incorporate or communicate with a certificate authority.

Figure 2:
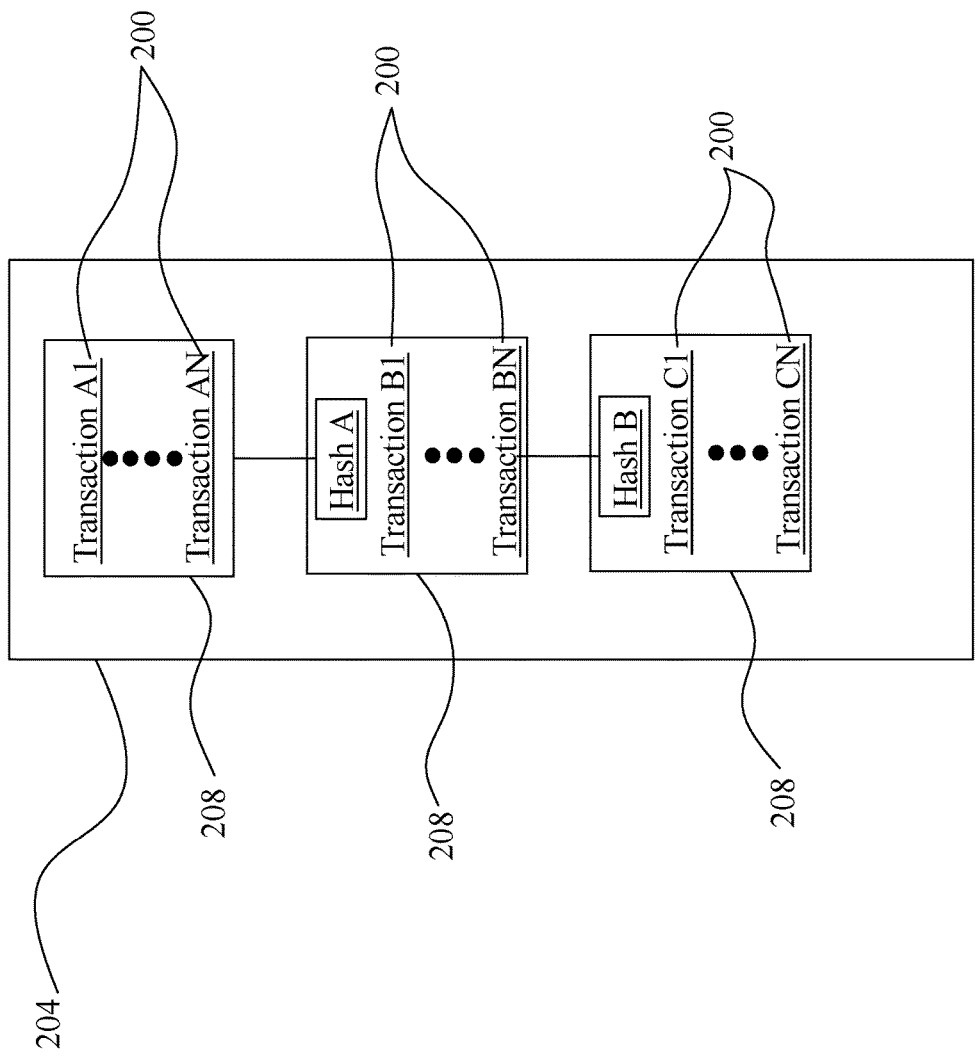
FIG. 2 is a block diagram illustrating an exemplary embodiment of a temporally sequential listing of digitally signed assertions.

Referring now to FIG. 2, system 100 may be used to perform one or more processing steps necessary to create, maintain, and/or authenticate a digitally signed assertion 200. In one embodiment, at least a digitally signed assertion 200 is a collection of textual data signed a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address may include a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a evaluating device 104 as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. In some embodiments, temporally sequential listing 204 records a series of at least a digitally signed assertion 200 in a way that preserves the order in which the at least a digitally signed assertion 200 took place. A temporally sequential listing, as used herein, may include without limitation any temporally sequential listing as described in Provisional Application No. 62/758,367.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a evaluating device 104, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the evaluating device 104) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 4. For example, and without limitation, at least a digitally signed assertion 200 may include one or more encrypted or otherwise secured or partitioned memory entries as entered for instance using a secure computing module 108 or according to a secure computing protocol as described in further detail below.

Referring again to FIG. 1, in some embodiments, secure computing module 108 and/or evaluating device 104 may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules, man in the middle or other attacks.

Still referring to FIG. 1, in an embodiment, evaluating device 104 is configured to receive an authorization token 124. Authorization token 124 may be received directly or indirectly from any certificate authority 128 and/or distributed certificate authority 128, including without limitation as described in Provisional Application No. 62/758,367. As used in this disclosure, an authorization token 124 is an element of data, digitally signed by a first device, containing an authorization datum conferring an access right, authority, and/or confidence level on a second device. An authorization token 124 received by evaluating device 104 may confer the authority on cryptographic evaluator to generate a digitally signed assertion, enter a digitally signed assertion in a temporally sequential listing, generate an additional authorization token 124, or the like. In an embodiment, where a digitally signed assertion is used to perform a transaction, authorization token 124 may confer the right to perform that transaction on evaluating device 104. Where a transaction has a given transaction amount and/or type, authorization token 124 may confer the right to engage in a transaction having that transaction amount and/or type. Alternatively or additionally, other devices in system 100 and/or having access to a digitally signed assertion created by evaluating device 104 may be able to evaluate a confidence level of evaluating device 104 and authenticate the digitally signed assertion as a function of the confidence level. Authentication of digitally signed assertions may be performed, without limitation, as described in U.S. Nonprovisional application Ser. No. 16/400,636, filed on May 1, 2019, the entirety of which is incorporated herein by reference.

With continued reference to FIG. 1, an identifier of evaluating device 104 may be incorporated in at least an authorization datum; identifier may be specific to evaluating device 104 or may be a group identifier as described above, including without limitation a group public key; in other words, authorization token 124 may not be tied to a unique identifier of evaluating device 104. A device generating authorization token 124 may confirm authenticity of a manufacturer/endorsing signature and/or signature made using identifier, and then provides authorization token 124 following confirmation; token may be a time limited token as described in further detail below, such that the evaluating device 104 must be re-authenticated before expiration continue performing actions as permitted by authorization token 124. As described further below, an authorization token 124 may include a signed timestamp and counter value, a passphrase required to decrypt messages on the network, or some combination. Authorization datum may include a datum granting one or more rights that may be requested in an authorization request as described above. For instance, and without limitation, an authorization datum may include a digital certificate as described above; digital certificate may, for instance and without limitation, associate an identity of a user or entity operating evaluating device 104 with an identifier of remote device, confer upon remote device access rights to one or more resources incorporated in or connected to system 100, associate evaluating device 104 with a given confidence level, grant a transfer of assets, data, and/or access rights from one device to another, or the like. An authorization datum may confer a right to access one or more resources incorporated in or connected to system 100. An authorization datum may associate an identity of a user or entity operating evaluating device 104 with an identifier of remote device. An authorization datum may confer upon remote device access rights to one or more resources incorporated in or connected to system 100. An authorization datum may associate evaluating device 104 with a given confidence level. An authorization datum may grant a transfer of assets, data, and/or access rights from one device to another, or the like. In an embodiment, an authorization datum may classify evaluating device 104 as authorized to generate authorization tokens 124 and/or to perform actions as a participant and/or verifying node in a distributed certificate authority 128. In an embodiment, the authorization datum may certify evaluating device 104 to participate on the network as a non-verifier. In an embodiment, the authorization datum may certify evaluating device 104 to access system 100 and/or a network implemented by the system 100.

Still referring to FIG. 1, in some cases it may be desirable to maintain anonymity (either anonymity of the evaluating device 104 with respect to a device generating an authorization token 124, and/or anonymity of the evaluating device 104 in subsequent use of the authorization token 124 on the network), while still issuing at least an authorization datum. In some embodiments a resulting authorization token 124 may include a temporal attribute 132. To facilitate anonymity, in an exemplary embodiment of authorization token 124 in which it is desired to maintain anonymity of the remote device while using at least a authorization token 124, the at least a authorization token 124 may contain at least one of the following attributes: a secure timestamp indicating the time that the token was created, a monotonic counter value or other datum unique to the authorization token 124 for this particular evaluating device 104, and/or a session key conferring access to the network at the time of token creation. Additionally or separately, at least a authorization token 124 may include an expiration period, e.g. a fixed time limit relative to the verifier's local time the token was created or issued, and may include at least a trust level based upon the properties of the evaluating device 104 attested in the authorization process, as described herein. It may be desirous to separately or additionally provide at least a session key enabling evaluating device 104 to encrypt and/or decrypt messages to at least a second evaluating device 104, or group of such devices, based on properties of commonality between devices. In non-limiting example, session key may be a symmetric key conveyed via secure channel from a device generating authorization tokens 124, and/or an asymmetric key, multisignature, threshold signature or key system resulting from multi-signature or threshold signature as described above, or other key system or datum associated with a device generating authorization tokens 124 during at least a time epoch. The foregoing may be signed in whole or in part, or any logical combination, by a device generating authorization tokens 124. In an embodiment, a device generating authorization tokens 124 may share via secure channel a copy of or subset of a temporally sequential listing that lists authorization tokens 124, and additional parameters including at least a secret, in order for the evaluating device 104 to evaluate authorization token 124 credentials of another device as being contained or represented in the listing.

In an alternative or additional embodiment, and continuing to refer to FIG. 1, at least an authorization token 124 may be created via blind signatures. In a representative embodiment of blind signature-based authorization token 124, the at least a evaluating device 104 wishing to receive at least an authorization token 124 may generate multiple different lease certificates. At least a evaluating device 104 may encrypt all or the majority of lease certificates and communicate them to a device generating authorization tokens 124. A device generating authorization tokens 124 may select one or more certificates at random. At least a evaluating device 104 may further provide decryption keys to all but one or more certificates. A device generating authorization tokens 124 may evaluate at least one of the certificates to which the device generating authorization tokens 124 has been given decryption keys. If device generating authorization tokens 124 deems that the certificates, based on information obtainable, are authentic, then the device generating authorization tokens 124 blindly signs the one or more certificates for which the device generating authorization tokens 124 does not have a key, and communicates this to evaluating device 104 for use as at least a authorization certificate, as described herein.

With continued reference to FIG. 1, a device generating authorization tokens 124 may digitally sign an authorization datum. Signing authorization datum may include any form of digital signature described above, including generating a secure proof as described above; The secure proof may be implemented according to a direct anonymous attestation protocol, and may include a digital signature, zero-knowledge proof, and/or a PUF as described above.

Still referring to FIG. 1, a device generating authorization tokens 124 may generate an authorization token 124 containing the digitally signed authorization datum. Authorization token 124 may include a temporal attribute 132, that may set time limits of validity of evaluating device 104 within a particular group of services, or for all network functions. In an embodiment, authorization token 124 may include a time-varying token, which may have a time limit after which time-varying token is no longer valid. Time limit may be calculated from an initial time, which may be a datum linked to a particular timestamp or other value representing a fixed moment in time, associated with time-varying token; initial time may be a time of creation, a time of verification, or other significant time relating to validity of time-varying token. Initial time may include, without limitation, a timestamp, which may include a secure timestamp, and/or a datum linked to a secure timestamp such as a cryptographic hash of the secure timestamp or the like. Initial time may be recorded in or with token. As a non-limiting example, time-varying token may include initial time, along with an identification of at least a evaluating device 104, where identification may be membership in a group but otherwise anonymous, a unique persistent identification, or a unique but anonymous identification, and/or identification of a specific device, which may include any form of identification as described above, including without limitation a secure proof; alternatively or additionally, where time-varying token is recorded in a temporally sequentially listing, initial time may be recorded as a time of insertion of a record or lot of records including time-varying token, a time of creation or authentication of a sublisting containing time-varying token, or the like. Time-varying token may include one or more attestations from other devices in system 100; as a non-limiting example, time-varying token may include secure proofs, such as without limitation digital signatures from one or more devices. As an illustrative example, one or more devices identified and/or authorized in time-varying tokens that have not yet expired may create one or more attestations included in a time-varying token linked to a device to be classified as a verified device using one or more attestations. In other words, a community of currently verified devices may be able to authenticate a device that is not currently verified. In an embodiment, a community of currently verified devices may evaluate the digitally signed authorization datum of first verifying node 104, identify evaluating device 104 and the timestamp, and then apply a time limit to evaluating device 104. In such an example, the time limit may be found in the authorization token 124 or may just be known by, for instance, network, group or subgroup specific parameters, application specific parameters, parameters associated with the confidence level or trust level of a device, and any combination thereof.

Still referring to FIG. 1, a temporal attribute 132 such as a time limit may be based on the confidence level of evaluating device 104. Confidence level may be calculated and assigned to evaluating device 104 as previously discussed above. Confidence level, as an indication of trustworthiness and/or robustness to compromise by malicious actors of evaluating device 104, may impact a temporal attribute 132 of the authorization token 124. For example, evaluating device 104, having a high confidence level, thereby indicating a very trustworthy evaluating device 104, may be granted a time-varying token with a longer time limit than a evaluating device 104 that has a very low confidence level, and is not a trustworthy evaluating device 104.

With continued reference to FIG. 1, a temporal attribute 132 and/or token containing the temporal attribute 132 may be available for other devices to view. In an embodiment, the temporal attribute 132 and/or token containing the temporal attribute 132 may be linked to the authorization token 124. In an embodiment the authorization token 124 may include a public key of a cryptographic system. In such an instance, other devices on the network may be able to access the public key and view both the duration of the authorization token 124 and how recently the authorization token 124 was generated. In an embodiment, the temporal attribute 132 and/or token containing the temporal attribute 132 may be linked to evaluating device 104 identifier and may be stored in a temporally sequential listing. Other devices may have access to the temporally sequential listing and may be able to view the authorization token 124 of evaluating device 104. Authorization token 124 may further include or be associated with a confidence level that a device generating authorization tokens 124 has associated with evaluating device 104 as described above. In an alternative embodiment where the specifics of time remaining on an authorization token 124 may be undesirable to expose, e.g. when such information may aid malicious actors in preferentially targeting a particular evaluating device 104, authorization token 124, in the open or via shared cryptographic key specific to authenticate devices or a subset of authenticated devices, may simply indicate whether or not the token is valid at time of inquiry. It may be desirable to limit the number of requests for validity of a token, e.g. to avoid exposing information that may aid malicious actors in preferentially targeting a particular evaluating device 104.

Still referring to FIG. 1, an authorization token 124 received by cryptographic evaluator may be shared with at least one additional device. Sharing may include providing the at least a device with the authorization token 124 to prove that a evaluating device 104 has been verified and/or granted some type of privilege and/or access as to the network. In an embodiment, sharing may include making the authorization token 124 public so that it is visible to other devices, or a subset of devices (e.g. only those with a shared cryptographic key) to be easily ascertained. In an embodiment, sharing may include inserting the authorization token 124 may be recorded in a temporally sequential listing. In another embodiment, generating the authorization token 124 may include generation by a device generating authorization tokens 124 of the at least a key unique to evaluating device 104 and the at least a time-varying parameter as described above, and communication of the at least a unique private key or keypair via secure channel to at least a evaluating device 104. A device generating authorization tokens 124 may additionally append the at least a unique device specific, session specific public key, its hash, or other datum whose association with the at least a unique key signature may be determined given knowledge of particular parameters, those parameters may include at least a secret, to a temporally sequential listing. The effective outcome of this series of steps may be that the evaluating device 104 has been authenticated as being a valid member of one of more group keys, e.g. indicating that the device is authentically manufactured by a given manufacturer. Subsequently a device generating authorization tokens 124 may generate a unique keypair specific to evaluating device 104 and share this over secure channel to evaluating device 104, along with e.g. a symmetric key or other secret specific to an authorization session duration. A device generating authorization tokens 124 may also append corresponding key (e.g. the session-specific, device specific public key from previous keypair generation) or some other datum unique to the device and session but otherwise unlinkable to the evaluating device 104, to a temporally sequential listing.

Still referring to FIG. 1, in an embodiment, a plurality of devices may sign an authorization token 124. Devices signing an authorization token 124 may follow an order of signing, which may be established using a random oracle, or in an order established by a bitmask magnitude, device identifier magnitude, or any other ordering of data associated with devices. Alternatively or additionally, each device may post a distinct authorization token 124 to system 100, which may be maintained in a temporally sequential listing or any other suitable data structure including. In an embodiment, a combination of signatures of devices may be used as input to a key derivation function, either directly or obfuscated using a one-way function prior to key derivation function.

Continuing to refer to FIG. 1, any device participating in system 100 may determine whether evaluating device 104 is authorized to perform a given action or access a given resource or datum by evaluating each authorization token 124; for instance, where N of K verifying nodes are required to have authorized a right requested in authorization request, each device may verify that N signing devices have generated authorization token 124 or tokens as described above. Each device may further determine whether each device signing an authorization token 124 has validly implemented a random oracle procedure or other selection procedure for selecting such devices to participate in generation; contribution of a device that did not correctly follow a selection procedure be ignored for purposes of determining whether evaluating device 104 is authorized as required.

Still viewing FIG. 1, each device in system 100 determining whether evaluating device 104 is authorized to perform an action may use a threshold cryptography protocol, as described above. In other words, a plurality of devices enacting methods as described above may be treated as a group of certificate authorities acting to authenticate in coordination, with the requirement that a threshold number of the group of certificate authorities, and/or a threshold proportion of the group of certificate authorities, agree (e.g. "threshold cryptography") for authorization to be valid; threshold may include a number of verifying nodes. Threshold may include an aggregate confidence level threshold. For instance, where each verifying node has included a confidence level in an authorization token 124, confidence levels may be aggregated according to any process or process steps described above to produce an aggregate confidence level, which must exceed a threshold, or aggregate confidence level of agreeing verifying nodes may be required to represent a threshold proportion of aggregate confidence level of all verifying nodes in group. Additional embodiments may include group signature schemes that issue certificates on a membership public key generated by a secure computing module as described in further detail above; in such scenarios, authentication may include proof by the secure computing module that the secure computing module possesses a secret key to a public key/certificate pair.

In an embodiment, system 100 may act to collect manufacturer group public keys and issue an authorization token 124 to a particular device, conferring a trust level, which you may be publicly exposed to other group members. Authorization token 124 may be released as a "session" public key with an expiration as described above, and signed by the verifier; token may include a session key linked to a private key sent in an encrypted for to evaluating device 104, permitting the evaluating device 104 so it can sign and/or decrypt using session key. In embodiments, authorization token 124 may include elements such as or analogous to EPID basename, session decryption keys, secret passphrases, decryption keys that may enable access to a directory, and the like. Authorization token 124 may alternatively or additionally include a reference to device identifier, such as group public key, device-specific public key, or the like, which may be used similarly to session key.

In an embodiment, evaluating device 104 is configured to interact with or store a local portion or instantiation of an authorization listing 136. Authorization listing 136 may include any data structure suitable for storage and/or retrieval of data records, including any distributed storage data structure such as a distributed hash table and/or any temporally sequential listing as described above in reference to FIG. 2. Authorization listing 136 may list authorization tokens 124; that is, each listed token may be included in or as a digitally signed assertion in authorization listing 136 or may be identified in a digitally signed assertion in authorization listing 136. Devices in system 100 may receive and/or evaluate authorization tokens 124 by referring to digitally signed assertions in authorization listing 136.

In an embodiment, evaluating device 104 is configured to interact with or store a local portion or instantiation of transaction listing 140. Transaction listing 140 may include any data structure suitable for storage and/or retrieval of data records, including any distributed storage data structure such as a distributed hash table and/or any temporally sequential listing as described above in reference to FIG. 2. Transaction listing 140 may list assignment of tasks such as computing tasks, transactions transferring items of value, transactions storing elements of information, transactions storing determinations of confidence levels, and/or any other transactions as described in U.S. Nonprovisional application Ser. No. 16/400,636.

Figure 3:
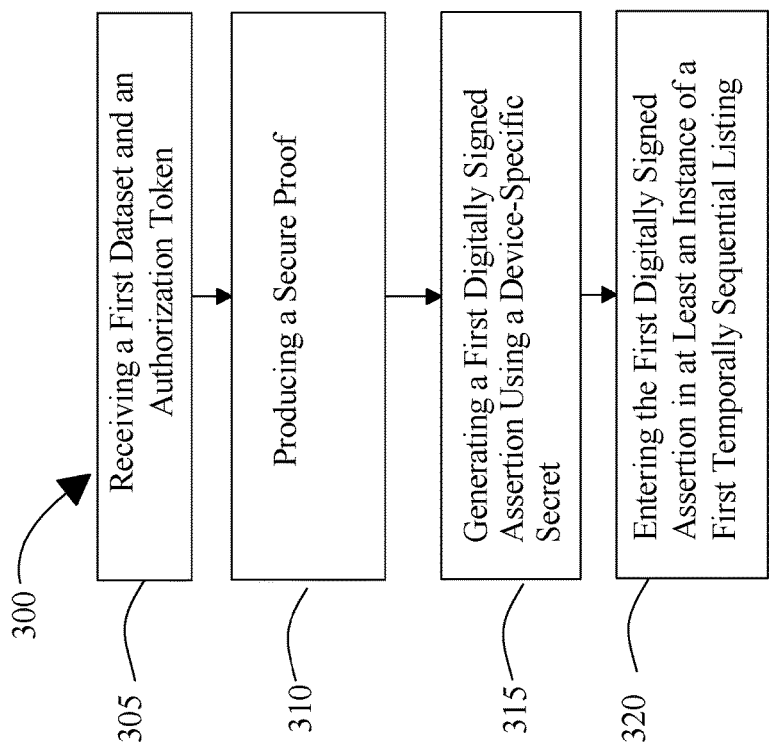
FIG. 3 is a flow diagram illustrating an exemplary method of recording a digitally signed assertion using an authorization token.

Referring now to FIG. 3, an exemplary embodiment of a method 300 of recording a digitally signed assertion 200 using a secure computing module 108 is illustrated. At step 305, a first dataset and an authorization token 124 are received at a evaluating device 104 incorporating a secure computing module 108. First dataset may include any data suitable for inclusion in a digitally signed assertion 200. For instance, and without limitation, where a first digitally signed assertion 200 is to be created using first dataset, receiving the first dataset may include receiving a reference to a second digitally signed assertion 200. Reference to second digitally signed assertion 200 may include, without limitation, a hash of digitally signed assertion 200, an identifier, such as a globally unique identifier (GUID) or universally unique identifier (UUID), or any other suitable identifier describing second digitally signed assertion 200, a reference to an address or other datum included in second digitally signed assertion 200, or the like. Where first digitally signed assertion 200 is to be inserted in at least an instance of a first temporally sequential listing 204, second digitally signed assertion 200 may be entered in the first temporally sequential listing 204. Alternatively or additionally, second digitally signed assertion 200 may be entered in a second temporally sequential listing 204, such as another block chain or immutable ledger; reference to such an entry may be performed using a side chain, hash tree, or the like. Where evaluating device 104 produces a first secure proof as described in further detail below, dataset may include a reference to a second secure proof. Similarly, receiving first dataset may include receiving a reference to a second dataset. Such references to second digitally signed assertion 200, second secure proof, and/or second dataset may perform various functions, including linking first digitally signed assertion 200 to one or more past digitally signed assertions 200, so as to permit evolution of terms in a smart contract, exchanges of crypto-currency, or the like. References may also enable additional parties, such as one or more additional cryptographic evaluators, to evaluate a confidence level in evaluating device 104 and/or first digitally signed assertion 200 by reference to additional data; for instance, second secure proof may be signed by a evaluating device 104 associated with a high degree of confidence, as a voucher for the authenticity of the data contained therein, or may include a secure timestamp, element of attested memory, or output an/or state of an attested computation as explained in further detail below, providing parties with a way of assessing authenticity of first dataset and/or first digitally signed assertion 200.

Still referring to FIG. 3, receiving authorization token 124 may include receiving the authorization token 124 from one or more devices operated by a certificate authority 128; one or more devices may include, without limitation, one or more devices operating a distributed certificate authority 128 as described above in reference to FIG. 1. Alternatively or additionally, evaluating device 104 may receive authorization token 124 by locating authorization token 124 in authorization listing 136, Posting of authorization tokens 124 to authorization listing 136 may be performed as described in U.S. Provisional Application 62/758,367. Authorization token 124 may include any authorization token 124 as described above, including without limitation any authorization token 124 having a temporal attribute 132, such as a time of expiration, a period of validity, or the like.

With continued reference to FIG. 3, receiving authorization token 124 may include generating a verification datum; evaluating device 104 may generate verification datum using any process and/or process step as described above for generation of a verification datum. Evaluating device 104 may provide verification datum to a certificate authority 128, where providing verification datum may include any action making it possible for certificate authority 128 to receive, use, manipulate, and/or retrieve verification datum. Providing may include, without limitation, sending verification datum to a device operated by and/or implementing a certificate authority 128. Alternatively or additionally, evaluating device 104 may provide verification datum by posting verification datum to a data structure available to a device operated by and/or implementing a certificate authority 128; data structure may include any distributed data structure; any temporally sequential listing, authorization listing 136, and/or transaction listing 140. A device operated by and/or implementing a certificate authority 128 may sign verification datum using any secure proof. Alternatively or additionally, a verification datum associated with a secret possessed by evaluating device 104 may be a verification datum published and/or provided by any other device, including a device operated by a manufacturer and/or a device operated by and/or implementing a certificate authority 128, for instance as described in U.S. Provisional Application 62/758,367.

Still referring to FIG. 3, at step 310, a first secure proof is produced at evaluating device 104. Generation of first secure proof may be performed using any processes, process steps, and/or combinations thereof as described above in reference to FIGS. 1-2.

With continued reference to FIG. 3, producing the secure proof further comprises generating the secure proof using a secure timestamp. Generation of a secure timestamp may be implemented in any manner described in this disclosure or in U.S. Provisional Application 62/758,367. Generating secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that the secure computing module 108 is an authentic secure computing module 108 that has the property of attested time.

With continued reference to FIG. 3, generating the secure timestamp may include recording the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 108. Additional data may include one or more additional data, including sensor data or a hash of data, that are received or generated by temporal attester 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other cryptographic evaluators may evaluate confidence levels in evaluating device 104 or other party generating secure timestamp and/or perform threshold cryptography with a plurality of such parties, each of which may have performed an embodiment of method to produce a secure timestamp. In an embodiment, cryptographic evaluators or other parties authenticating first digitally signed assertion 200 may perform authentication at least in part by evaluating timeliness of entry and/or generation of first digitally signed assertion 200 as assessed against secure timestamp. In an embodiment, producing the secure proof further comprises generating the secure proof using an attested computing protocol; this may be performed, as a non-limiting example, using any protocol for attested computing as described above. Timestamp authority may include, without limitation, a distributed and/or decentralized timestamp authority as disclosed in Provisional Application No. 62/758,367.

Still referring to FIG. 3, secure computing module 108 and/or evaluating device 104 may generate one or more elements of additional information that user or device may use to evaluate secure proof. For instance, secure computing module 108 and/or evaluating device 104 may generate a public key; public key may be provided automatically to any querying device. Alternatively or additionally, public key may be provided to a manufacturer of secure computing module 108, permitting manufacturer to act as a certificate authority 128 for secure computing module 108. Similarly, secure computing module 108 and/or evaluating device 104 may generate data necessary to perform verification of a zero-knowledge proof by any verifier as described above.

At step 315, and with continued reference to FIG. 3, a first digitally signed assertion 200 may be generated at evaluating device 104 as a function of first dataset and first secure proof. First digitally signed assertion 200 may include first dataset. First digitally signed assertion 200 may include a reference or link to first dataset, including without limitation a cryptographic hash of first dataset, a root of a hash tree, Merkle tree, or the like including first dataset, a uniform resource locator (URL) referring to a location containing first dataset, or the like. First digitally signed assertion 200 may include first secure proof. First digitally signed assertion 200 may include verification information to verify first secure proof; for instance, where first secure proof includes a digital signature generated using a private key of a public key cryptographic system, first digitally signed assertion 200 may include a corresponding public key. Similarly, where first secure proof includes a zero-knowledge proof, first digitally signed assertion 200 may include verification data useable to verify zero-knowledge proof. In an embodiment, first digitally signed assertion 200 may include at least a second secure proof at least a second secure proof may include, as a non-limiting example, an attested timestamp, a digital signature or zero-knowledge proof generated by another evaluating device 104 and/or other party, or the like.

Still referring to FIG. 1, generation of first digitally signed assertion may include, without limitation, generation of a new authorization token 124; generation of a new authorization token 124 may be performed, without limitation, as described in U.S. provisional Application No. 62/758,367. Evaluating device 104 may post a new authorization token 124 to authorization listing 136. Alternatively or additionally, generation of first digitally signed assertion may include generation of any transaction described in U.S. Nonprovisional application Ser. No. 16/400,636; first digitally signed assertion may be posted to transaction listing 140.

At step 320, and with continued reference to FIG. 3, evaluating device 104 enters first digitally signed assertion 200 in at least an instance of first temporally sequential listing 204. Evaluating device 104 may enter first digitally signed assertion 200 in at least an instance directly; for instance, evaluating device 104 may have a local copy of first temporally sequential listing 204 and/or a local copy of a sub-listing 208 of first temporally sequential listing 204, such as without limitation a partially completed or otherwise recent block in a blockchain. Alternatively or additionally evaluating device 104 may transmit first digitally signed assertion 200 to one or more remote devices that may enter first digitally signed assertion 200 in at least an instance of temporally sequential listing 204. First temporally sequential listing and/or any temporally sequential listing to which first digitally signed assertion is posted may include, without limitation, any temporally sequential listing described in this disclosure, including authorization listing 136 and/or transaction listing 140.

In an embodiment, and continuing to refer to FIG. 3, evaluating device 104 and/or remote device may identify a currently active sub-listing 208 of the first temporally sequential listing 204. As noted above, a sub-listing 208, such as a block in a block chain, may become immutable once "mining" or "forging" of the sub-listing 208 is complete; there may therefore be only a single sub-listing 208 that is currently active, where "active" signifies that the sub-listing 208 is one in which it is still possible to enter digitally signed assertions 200, or otherwise alter or augment contents of sub-listing 208. In an embodiment, any recently received instance of temporally sequential listing 204 includes a currently active sub-listing 208; where, as may be the case in proof of stake protocols, a miner or forger has been selected to mine a particular sub-listing 208 or block, the selected miner or forger may also have an authoritative copy of currently active sub-listing 208. Where such a copy exists, entries may be posted in sub-listing 208 using attested time, for instance by using secure timestamps as described above, to provide an additional means for verifying and authenticating entries. In an embodiment, entering first digitally signed assertion 200 in currently active sub-listing 208 further includes authenticating currently active sub-listing 208; authenticating may include verifying that a hash of at least one previous sub-listing 208 is correct, verifying earlier hashes in a hash chain, block chain, or the like, and/or verifying back to a genesis block, as described above in further detail.

Still viewing FIG. 3, any step or steps of method 300 as described above may be repeated, omitted, or modified consistently with any description of steps, components, modules, or means disclosed in this disclosure. For instance, and without limitation, a sequence of digitally signed assertions 200 may be created and entered using any processes, modules, and/or components as described herein; digitally signed assertions 200 in the sequence may refer to previously entered digitally signed assertions 200 as disclosed above.

In an embodiment, use of secure computing module 108 to generate and enter digitally signed assertions 200 enables any parties, including without limitation cryptographic evaluators, to link such digitally assigned assertions to secure computing module 108 and/or cryptographic evaluator; this may in turn be used to establish a confidence level regarding cryptographic evaluator, a plurality of cryptographic evaluators, and the like. Where secure computing module 108 is used to perform anonymous or pseudonymous signature protocols such as without limitation DAA, methods and systems disclosed herein may permit association of one or more digitally signed assertions 200 with a particular cryptographic evaluator and/or secure computing module 108 without necessarily revealing an identity of such a cryptographic evaluator and/or secure computing module 108 outside of temporally sequential listing 204 or an ecosystem containing temporally sequential listing 204.

Figure 4:
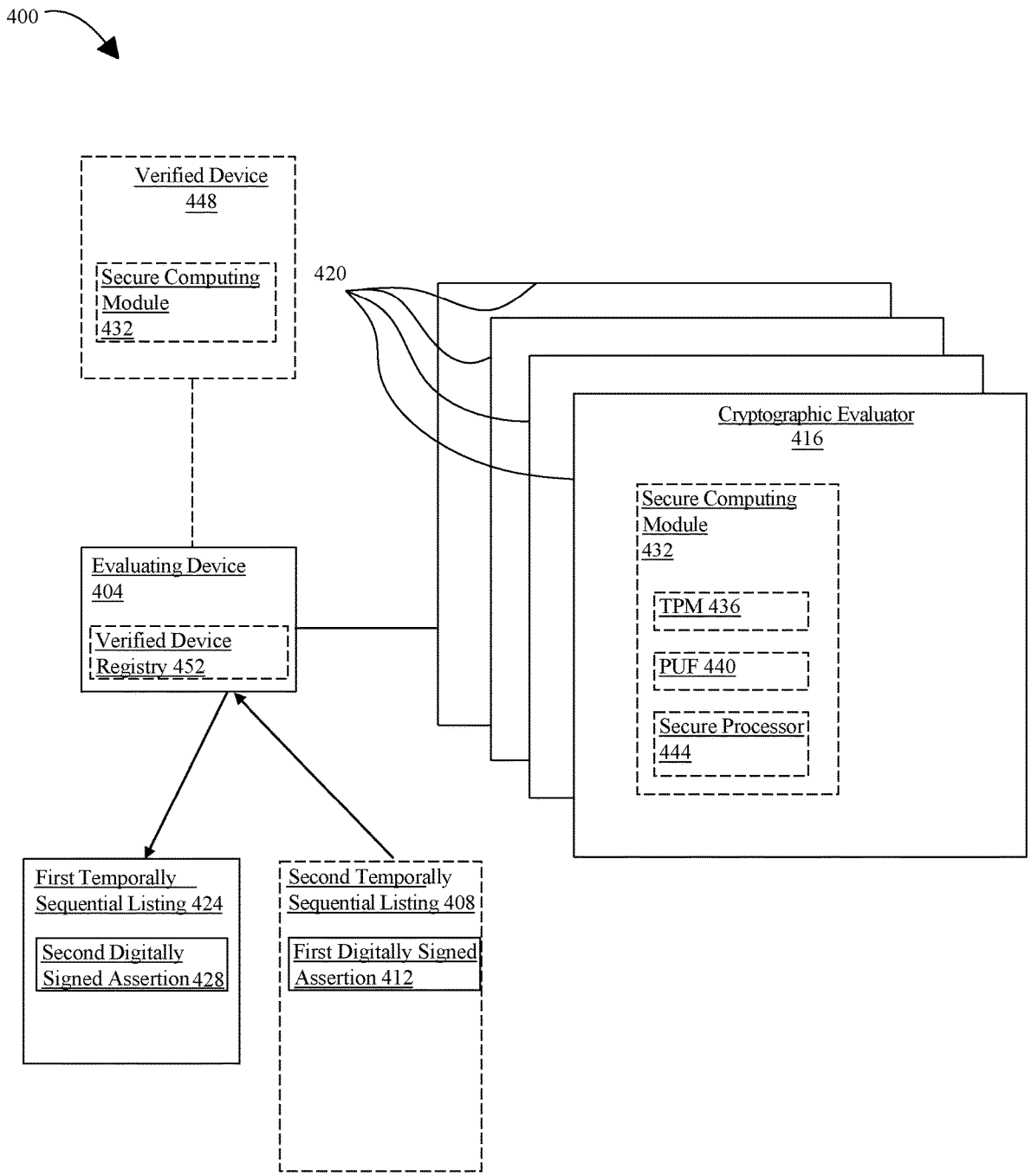
FIG. 4 is a block diagram illustrating an exemplary embodiment of a system for importing a digitally signed assertion to a temporally sequential listing.

Referring now to FIG. 4, an exemplary embodiment of a system 400 for importing a digitally signed assertion to a first temporally sequential listing is illustrated. System 400 includes an evaluating device 404. Evaluating device 404 may include any processor as described in this disclosure. Evaluating device 404 may be included in any computing device as described in this disclosure, including without limitation any device and/or combination of devices suitable for use as an evaluating device 104 as described above. Evaluating device 404 may include a single processor operating independently, or may include two or more processors operating in concert, in parallel, sequentially or the like; two or more processors may be included together in a single computing device or in two or more computing devices. Evaluating device 104 may be an element of, be in communication with, or otherwise utilize a secure computing module 432 as described above; secure computing module may include, without limitation, a TPM 436, a PUF 440, and/or a secure processor 444 as described above. Evaluating device 104 may be or include a cryptographic evaluator as described below in further detail.

Still referring to FIG. 4, evaluating device 404 may include in memory of evaluating device 404, or be communicatively connected to a device including a second temporally sequential listing 408, which may include any temporal sequential listing as described above in reference to FIG. 2, containing a first digitally signed assertion 442; "including" second temporally sequential listing, as used herein, may include inclusion of a portion of subset of second temporally sequential listing such as a sublisting as described below or a "block," an entire copy of second temporally sequential listing, or any other suitable manner of inclusion that may occur to a person skilled in the art upon review of the entirety of this disclosure.

Evaluating device may be communicatively connected to a cryptographic evaluator 416, which may be one of one or more cryptographic evaluators 420; each cryptographic evaluator 416, 420 may be implemented using any device suitable for implementation of a cryptographic evaluator and/or evaluating device 104 as described above. Some cryptographic evaluators may include verified devices, for instance as described above. Evaluating device 404 may include in memory of evaluating device 404, or be communicatively connected to a device including, a first temporally sequential listing 424 in which evaluating device 404 may insert a second digitally signed assertion 428. Evaluating device 404 may be designed and configured to perform any method step or steps as disclosed in this disclosure; as a non-limiting example, evaluating device 404 may be designed and configured to receive at least a communication including a first digitally signed assertion 412, which may be recorded in a second temporally sequential listing 408, assign a confidence level to the first digitally signed assertion 412, authenticate the first digitally signed assertion 412 as a function of the confidence level, generate a second digitally signed assertion 428 as a function of the first digitally signed assertion 412, and enter the second digitally signed assertion 428 in at least an instance of a first temporally sequential listing 424. Evaluating device 404 may include trusted hardware, including without limitation a secure computing module as described above. Evaluating device 404 may alternatively have no secure computing module. Any device of one or more cryptographic evaluators 420 may include a secure computing module as described above.

Figure 5:
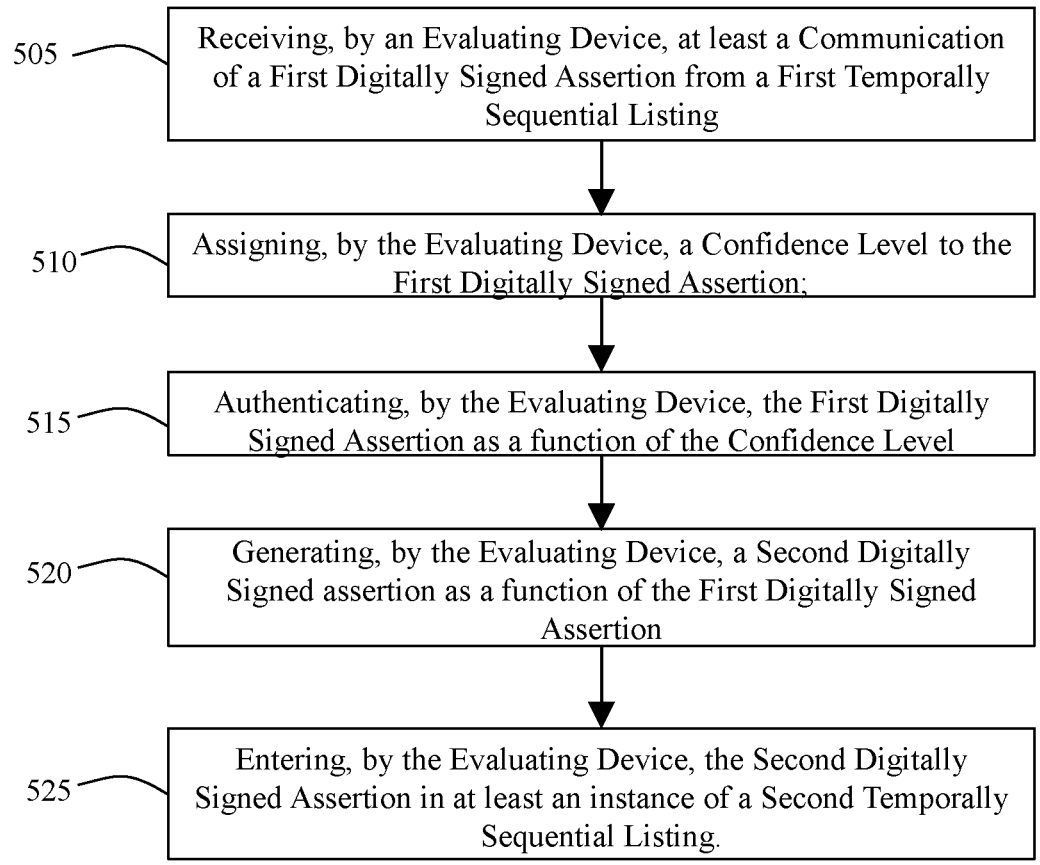
FIG. 5 illustrates particular implementations of various steps of a method of importing a digitally signed assertion to a temporally sequential listing.

Referring now to FIG. 5, an exemplary embodiment of a method 500 of importing a digitally signed assertion to a temporally sequential listing with a device is illustrated. At step 505, evaluating device 404 receives at least a communication from a cryptographic evaluator, verified device, or any other computing device including a first digitally signed assertion 412, which may be recorded in a second temporally sequential listing 408. Evaluating device 404 may receive at least a communication in any suitable form, including without limitation as textual data conveyed via electronic communication. At least a communication may include at least a packet set transmitted over a network; at least a packet set may be transferred over the network according to transfer control protocol/internet protocol (TCP/IP), hyper-text transfer protocol (HTTP), file transfer protocol (FTP), HTTP secure (HTTPS) or the like. At least a packet set may have data organized in one or more fields as described in further detail below; such data may be used for device fingerprinting or other device identification procedures as described in further detail below. Evaluating device 404 may alternatively or additionally receive at least a communication by retrieving it from memory where it has been stored either entirely or in a representation such as a cryptographic hash as described above. Retrieval may include retrieval from any suitable data structure; for instance, and without limitation, retrieval may include receiving a transaction recorded in a temporally sequential listing.

With continued reference to FIG. 5, at least a communication may be sent from a cryptographic evaluator, verified device, or any other computing device. Information related to the second temporally sequential listing may be a link to second temporally sequential listing 408, a piece of the second temporally sequential listing 408 such as a block in a block chain environment, all information encompassed in the second temporally sequential listing 408, or any other information related to the second temporally sequential listing. second temporally sequential listing may include an instance of a distributed ledger and a temporally ordered plurality of sub-listings, wherein each sub-listing of the temporally ordered plurality of sub-listings contains at least a digitally signed assertion.

In an embodiment, and still referring to FIG. 5, first digitally signed assertion may include an attestation conferring proof of endorsement by a third party conferring a confidence level, level of access, authorization token, which may be any authorization token as described in this disclosure, and/or demonstration of identity and/or membership in a group of devices or entities on a device that signed the first digitally signed assertion; device that signed first digitally signed assertion may be a device directly or indirectly transmitting first digitally signed assertion, including without limitation by posting such assertion to second temporally sequential listing 408. Third party may, for instance, have signed a verification datum linked to digital signature of first digitally signed assertion; first digitally signed assertion may be signed using hardware of signing device, for instance as performed in DAA or related protocols, and/or may be a delegatable credential in a chain of attestation from third party. Third party may include, without limitation, a verified device as described above, a manufacturer of signing device, and/or other trusted device and/or device operated by a trusted entity. First digitally signed assertion may include proof and/or endorsement by third party of various attributes of signing device, including without limitation build version, firmware version, a lot of secure computing modules to which device belongs, or the like.

At step 510, and with continued reference to FIG. 5, evaluating device 404 assigns a confidence level to first digitally signed assertion. Assigning confidence level may comprise identifying at least a first cryptographic evaluator signing first digitally signed assertion and assigning the confidence level as a function of the identification of the at least a first cryptographic evaluator. Identification of at least first cryptographic evaluator may involve evaluating a secure proof generated by the at least a first cryptographic evaluator and identifying the at least a first cryptographic evaluator as a function of the secure proof. Secure proof may include a digital signature, a direct anonymous attestation protocol, a zero-knowledge proof, and/or an output derived from a PUF, as described in further detail above. Evaluating secure proof may further comprise receiving a verification datum corresponding to the secure proof and evaluating the secure proof as a function of the verification datum. Determining confidence level for at least a first cryptographic evaluator assigned to a first digitally signed assertion may also involve calculating a confidence level in an identity of the at least a first cryptographic evaluator and assigning the confidence level to the at least first cryptographic evaluator as a function of the confidence level in the identity. Assigning a confidence level may further comprise evaluating a third digitally signed assertion in a third temporally sequential listing of assertions, assigning a recorded confidence level to a cryptographic evaluator of the at least a first cryptographic evaluator, and assigning the confidence level as a function of the recorded confidence level.

In an embodiment, and still referring to FIG. 5, confidence level may be determined as part of, and or may include, applying at least a policy to the first digitally signed assertion; at least a policy may be applied by evaluating device 404, one or more cryptographic evaluators 416 and/or one or more verified devices. At least a policy may include instructions and/or commands to perform any confidence level determination, authentication, and/or evaluation as described in this disclosure and/or any disclosure incorporated by reference herein, and/or any combination thereof; application of at least a policy may include performance of any confidence level determination, authentication, and/or evaluation as described in this disclosure and/or any disclosure incorporated by reference herein, and/or any combination thereof. At least a policy may be stored in any suitable form including without limitation in the form of NIST Next Generation Access Control (NGAC) policies or similar policies.

With continued reference to FIG. 5, evaluating device may assign a confidence level to first digitally signed assertion 412 as a function of assigning a confidence level to second temporally sequential listing 408. Assigning a confidence level to second temporally sequential listing may include receiving a consensus and/or threshold evaluation of at least a confidence level in digitally signed assertion from a network of cryptographic evaluators and/or verified devices, which may be selected without limitation using any process described in this disclosure and/or disclosures incorporated by reference herein, including without limitation using a random oracle process, and which may determine confidence levels using any process and/or protocol described in this disclosure and/or disclosures incorporated by reference herein; alternatively, plurality of cryptographic evaluators may determine that first digitally signed assertion 412 is authentic without assigning a confidence level, which determination of authentication may be translated by evaluating device 404 into a confidence level in the first digitally signed assertion 412 as a function of any confidence level in cryptographic evaluators, second temporally sequential listing 408, protocols, assumptions, or the like as further described below.

In an embodiment, and still viewing FIG. 5, assigning confidence level to first digitally signed assertion further comprises assigning a confidence level to one or more cryptographic evaluators that authenticated first digitally signed assertion 412. Assigning a confidence level to the one or more cryptographic evaluators may include determining at least a confidence level of one or more cryptographic evaluators of a plurality of cryptographic evaluators digitally signing and/or authenticating first digitally signed assertion 412, aggregating the confidence levels of the one or more cryptographic evaluators to generate an aggregate confidence level and calculating the confidence level of the first digitally signed assertion and/or plurality of cryptographic evaluators as a function of the aggregate confidence level. Establishing the confidence level as a function of the aggregate confidence level may further comprise establishing an aggregate confidence level threshold and determining that the aggregate confidence level satisfies the aggregate confidence level threshold. Furthermore, assigning the confidence level in the second temporally sequential listing may involve performing a trusted time evaluation of at least an action perform by the one or more cryptographic evaluators.

Still referring to FIG. 5 evaluating device 404 may determine a confidence level in an identity of the at least a first cryptographic evaluator; assigning the at least a confidence level may include assigning the at least a confidence level as a function of the at least a confidence level in the identity. Confidence level in identity may be computed, for instance, using one or more statistical measures of reliability of the identification method used; for instance, a user may enter an instruction on evaluating device 404 providing statistics indicating success rates of various identification methods. Statistics may be collected based, as a non-limiting example, on discoveries of vulnerabilities in particular identification protocols and/or particular instances of secure computation module. User may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise assigning a confidence level as a function of the confidence level in the identity. Evaluating device 404 may also determine confidence level in identity as a function of, for instance, one or more algorithms collecting statistics concerning degree of accuracy in past iterations of 400 of a particular process for identifying at least a cryptographic evaluator.

With continued reference to FIG. 5, at least a confidence level in at least a first cryptographic evaluator may include a single confidence level assigned to a single cryptographic evaluator 416, a plurality of confidence levels assigned to a plurality of cryptographic evaluators 420, an aggregate confidence level of a plurality of cryptographic evaluators 420, or any other single or plural confidence level as described herein. Assigning a confidence level may include evaluating at least a digitally signed assertion signed by a cryptographic evaluator of the at least a first cryptographic evaluator and assigning a confidence level to the cryptographic evaluator as a function of the evaluation of the at least a digitally signed assertion. At least a digitally signed assertion may be identified as signed by at least a first cryptographic evaluator using any identification process or protocol as described above. In an embodiment, at least a digitally signed assertion may be incorporated in a temporally sequential listing of digitally signed assertions, which may include without limitation second temporally sequential listing 408 and/or first temporally sequential listing 424. For instance, where temporally sequential listing is a blockchain or similar data structure, each assertion of at least a digitally signed assertion may be included in the blockchain. At least a digitally signed assertion may include a plurality of digitally signed assertions. For instance, at least a first cryptographic evaluator may record a series of digitally signed assertions in temporally sequential listing; each transaction of the series of transactions may be authenticated by any process suitable for authenticating temporally sequential listings, including any process described herein for authentication of temporally sequential listings. As a further non-limiting example, at least a first cryptographic evaluator may enter an initial digitally signed assertion attesting to one or more elements of identification and/or authentication, including without limitation attestation of manufacturing date of at least a first cryptographic evaluator and/or secure computing module 432, identities, serial numbers, versions, or make of hardware components of at least a first cryptographic evaluator and/or secure computing module 432, or the like. Transactions performed by at least a cryptographic evaluator may be scored according to authenticity; for instance, trusted status may be conferred on at least a cryptographic evaluator only if a certain number of authenticated transactions have been performed by at least a cryptographic evaluator, a certain amount of value has been conveyed in authenticated transactions by at least a node, a certain proportion (which may be 100%) of transactions performed by at least a cryptographic evaluator have been successfully authenticated, or any other suitable benchmarking and/or scoring process or combination thereof. At least a digitally signed assertion may include assertions that were recorded in rejected instances of a temporally sequential listing 204, such as rejected forks; in an embodiment, confidence level may be reduced as a function of a number of rejected forks including assertions signed by at least a first cryptographic evaluator, for instance.

Still referring to FIG. 5, assigning the at least a confidence level in at least a first cryptographic evaluator may include receiving a consensus evaluation of the at least a confidence level from a network of cryptographic evaluators; for instance, all cryptographic evaluators currently connected to network may determine a confidence level concerning a particular cryptographic evaluator. This determination may be performed, for instance, by authenticating one or more current or past instances of a temporally sequential listing 204 and/or one or more sub-listings 208 thereof. Determination may include identification of one or more rejected instances of temporally sequential listing 204. Each cryptographic evaluator of plurality of cryptographic evaluators may provide a confidence level for the cryptographic evaluator to be evaluated. Evaluating device 404 and/or another processor communicatively coupled to network may calculate an aggregate confidence level based on confidence levels submitted by plurality of cryptographic evaluators; aggregation may be performed according to any method for aggregation of confidence levels described above. In an embodiment, aggregation may be weighted according to a previously determined confidence level of each cryptographic evaluator of plurality of cryptographic evaluators performing consensus determination of confidence level of cryptographic evaluator to be evaluated. This may include, e.g., ignoring confidence level submissions from evaluators having confidence levels below a certain threshold; alternatively or additionally, evaluating device 404 may request confidence level determinations by a plurality of evaluators previously determined to have a confidence level above a certain threshold level. Each cryptographic evaluator and/or other processor participating in consensus determination of confidence level may perform any action described herein for determining a confidence level, or any combination of such actions.

With continued reference to FIG. 5, assigning the at least a confidence level may include evaluating a digitally signed assertion assigning a recorded confidence level to a cryptographic evaluator of the at least a first cryptographic evaluator, and assigning the confidence level in the at least a first cryptographic evaluator as a function of the recorded confidence level. Digitally signed assertion may be any digitally signed assertion as described herein. Digitally signed assertion may be included in, include, and/or be associated with an authorization token as described above, which may confer a confidence level and/or credential on a cryptographic evaluator of at least a first cryptographic evaluator; in an embodiment, evaluating device 404 may determine a high confidence level upon determination that the authorization token includes a high confidence level and/or a credential authorizing a transaction or action represented in first digitally signed assertion. Alternatively or additionally, evaluating device 404 may use determination that authorization token includes a credential permitting entry and/or use of first digitally signed assertion instead of a confidence level, or equivalently set confidence level to a maximal value solely on the basis of the credential. Digitally signed assertion may be included in any temporally sequential listing as described herein; temporally sequential listing may include a temporally sequential listing relating identifiers of cryptographic evaluators to confidence levels, where identifiers may be any data usable as identifiers as described herein. Assignment of confidence level may be performed as a function of identifier; that is, identifier may be linked to an identity of a cryptographic evaluator, which may be used for assignment of confidence level as described in this disclosure. As a non-limiting example, one or more processors, a consensus process, evaluating device 404, and/or a network of cryptographic evaluators having a confidence level in excess of a threshold, may have previously evaluated a confidence level in a certain cryptographic evaluator; in an embodiment, such a confidence level may itself be recorded in an assertion listed in temporally sequential listing. A plurality of such assertions, corresponding to a plurality of cryptographic evaluators, may be listed; as such, evaluating device 404 may determine confidence level in one or more cryptographic evaluators solely by retrieving confidence levels so recorded. Alternatively or additionally, evaluating device 404 may combine such confidence levels with confidence level determinations made by other means. Combination may be performed, e.g., by retrieving such confidence levels from temporally sequential listing 204 for at least a first cryptographic evaluator and calculating a confidence level for at least a second cryptographic evaluator by any other process described above. As a further example, evaluating device 404 may retrieve a confidence level recorded in temporally sequential listing 204 for a given cryptographic evaluator, determine a confidence level for the same cryptographic evaluator, and then aggregate the two confidence levels according to any process as described above for aggregation of confidence levels.

Still referring to FIG. 5, evaluating device 404 may further weight or modify confidence level in at least a first cryptographic evaluator according to one or more additional factors. For instance, confidence level may be weighted according to how recently cryptographic evaluator signed a digitally signed assertion in an authenticated instance of temporally sequential listing 204, where a more recently authenticated assertion may result in a higher confidence level or higher weight assigned to the confidence level, and a less recently authenticated assertion may result in a lower confidence level or a lower weight assigned to that confidence level. As another example a cryptographic evaluator that has recently "sold off" a large amount of value and/or has an assertion in a sub-listing 208 currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

With continued reference to FIG. 5, assigning the at least a confidence level may include performing a trusted time evaluation of at least an action performed by the at least a first cryptographic evaluator. As a non-limiting example, secure proof may be generated using a secure timestamp, which may include any secure timestamp as described above. Generating the secure timestamp may include digitally signing the secure timestamp using any digital signature protocol as described above. In one embodiment authenticity of received data signals is established by utilizing a chain of attestation via one or more attestation schemes (in nonlimiting example, via decentralized anonymous attestation (DAA)) to verify that the secure computing module 432 is an authentic secure computing module 432 that has the property of attested time.

Still referring to FIG. 5, assigning confidence level to first digitally signed assertion 412 may further include receiving an insertion protocol for insertion of a digitally signed assertion in the second temporally sequential listing, calculating a confidence level in the insertion protocol, and assigning the confidence level in the first digitally signed assertion as a function of the confidence level in the insertion protocol. An insertion protocol, as used herein, is a process that devices or networks implementing second temporally sequential listing 408 follow when inserting a digitally signed assertion into second temporally sequential listing, including without limitation a process for creating mathematical representation of the digitally signed assertion, such as a hash, a process for digitally signing the digitally signed assertion, including without limitation a selection of secure proof and/or a specification for an asymmetric cryptographic system for performing the digital signature, a process for referencing a previously entered digitally signed assertion in second temporally sequential listing 408, a process for inclusion of or linking to data or data locations outside of second temporally sequential listing 408, or the like. Calculating confidence level in insertion protocol may include, without limitation, reference to a table or other data structure associating aspects of insertion protocol with confidence levels; for instance, an elliptic curve digital signature protocol with up-to-date schematics may have a high confidence level, whereas an elliptic curve digital signature protocol that is not compliant with up-to-date requirements, i.e. for key or seed sizes, may be assigned a lower confidence level as a result of the relatively greater probability that the signature may be hacked by brute-force methods. Calculating the confidence level in the insertion protocol may include receiving a degree of compliance for the insertion protocol, calculating a confidence level in the degree of compliance, and assigning the confidence level in the insertion protocol as a function of the confidence level in the degree of compliance; for instance, where insertion protocol requires a certain set of processing steps to be performed in a certain order, a confidence level may be associated with the degree to which these steps have been performed correctly, such that, in a non-limiting example, a lower confidence level may be assigned where first digitally signed assertion and/or another digitally signed assertion in second temporally sequential listing is performed using a smaller key size than required by the protocol. Calculating the confidence level in the insertion protocol may further include receiving an insertion protocol assumption set for the insertion protocol, calculating a confidence level in the insertion protocol assumption set, and assigning the confidence level in the insertion protocol as a function of the confidence level in the insertion protocol assumption set. As a non-limiting example, insertion protocol may be created with the assumption that all cryptographic evaluators promulgating second temporally sequential listing have the latest security updates, contain secure computing modules as described above, or the like; such assumptions may be compared to stored values for assumptions applicable to one or more processes for insertion, which may be stored with associated confidence scores. Calculating confidence level in the insertion protocol assumption set may further comprise receiving a degree of compliance for the insertion protocol assumption set, calculating a confidence level in the degree of compliance, and assigning the confidence level in the insertion protocol assumption set as a function of the confidence level in the degree of compliance; for instance, and without limitation, where one or more such assumptions are not met, evaluating device 404 may assign a lower confidence score to first digitally signed assertion even where first digitally signed assertion was created correctly according to a high-confidence insertion protocol.

Continuing to refer to FIG. 5, assigning confidence level to the first digitally signed assertion 412 may further include receiving a generation protocol for generation of a sub-listing in the second temporally sequential listing, calculating a confidence level in the generation protocol, and assigning the confidence level in the first digitally signed assertion as a function of the confidence level in the generation protocol. Generation protocol may include any process for creation of sub-listings as described above, including without limitation any process for proof-of-work block creation, proof-of-stake block creation, or the like. Each generation protocol may be recorded in a database, table, or other data structure accessible to evaluating device 404, and may have an associated confidence level included in the data structure and linked to the generation protocol. Calculating confidence level in generation protocol may include receiving a degree of compliance for the generation protocol, calculating a confidence level in the degree of compliance, and assigning the confidence level in the generation protocol as a function of the confidence level in the degree of compliance. As a non-limiting example, generation protocol may require that a target hash having a certain number of leading zeros be generated for a proof-of-work generation protocol, and that a consensus evaluation hashes allegedly mined blocks containing a nonce to match target hash; where target hash was incorrectly generated and/or mined blocks were not evaluated by a consensus process, evaluating device 404 may assign a lower confidence level as a result. Calculating confidence level in generation protocol may further include receiving a generation protocol assumption set for the generation protocol, calculating a confidence level in the generation protocol assumption set, and assigning the confidence level in the generation protocol as a function of the confidence level in the generation protocol assumption set; as a non-limiting example, a first proof-of-stake evaluation protocol may operate under the assumption that all devices be identified using digital certificates, and may be associated with a lower confidence level than an assumption set assuming all devices operate secure computing modules. As a further non-limiting example, assumption set assuming a weak adversary may be accorded a lower confidence level than an assumption set assuming a strong adversary, as the former may suggest a less robust protocol. Calculating confidence level in generation protocol assumption set may further comprise receiving a degree of compliance for the generation protocol assumption set, calculating a confidence level in the degree of compliance, and assigning the confidence level in the generation protocol assumption set as a function of the confidence level in the degree of compliance; degree of compliance with assumption set may include any calculation indicating to what extent assumption set was met in reality; for instance, a proof-of-work assumption set may assume a large number of cryptographic evaluators are participating in a mining process, and where fewer actually participated this may indicate that individual cryptographic evaluators may have a larger than assumed proportion of total computing power in the network, undermining the degree of security of the generation protocol and thus receiving a lower confidence level. As a further non-limiting example, an assumption concerning generation protocol may assume that generation of new sublistings occurs with a given average frequency or rapidity; where generation is taking much longer, it may indicate an opportunity for an adversary to manipulate the system, and lead to a lower confidence score.

With continued reference to FIG. 5, assigning the confidence level in the first digitally signed assertion may also comprise performing a trusted time evaluation of a private key associated with the first digitally signed assertion. The private key may be a product of an encryption protocol used to encrypt the first digitally signed assertion, and where the private key may have an identified associated with origination and transaction history. Trusted time evaluation may include use of secure timestamps and/or measures of time within second temporally sequential listing to evaluate, as a non-limiting example, how long a particular private key has been in use; in an embodiment, a private key that has been in use beyond a threshold time to sign first digitally signed assertion may be accorded a lower confidence level than a more recently created "fresh" private key. In an embodiment, and without limitation, trusted time evaluation may be performed with regard to an authorization token as described above in reference to FIGS. 1-3.

Still referring to FIG. 5, assigning confidence level may additionally or alternatively include determining that first digitally signed assertion is an escrowed transfer. In an embodiment, an escrowed transfer may be a transfer of an item of value, which may include funds, assets, information, or other items within first temporally sequential ledger that is only completed upon completion of a corresponding transfer of the item of value within second temporally sequential ledger. Escrowed transfer may include a transfer to evaluating device from a first cryptographic evaluator within second temporally sequential listing; evaluating device 404 may, for instance, be acting as an intermediary transferor of funds, assets, information, or other items from the first cryptographic evaluator and/or user thereof to a second cryptographic evaluator functioning within first temporally sequential listing and/or user thereof. In such a context, evaluating device may function as an intermediary device, receiving item of value from a transferor in second temporally sequential listing and conveying item of value to a transferee in first temporally sequential listing. In an embodiment, escrowed transfer may be enforced by at least an enforcement device, which may be at least a cryptographic evaluator trusted to enforce escrowed transfer protocols in second temporally sequential listing; at least an enforcement device may be chosen according to a protocol followed by a network implementing second temporally sequential listing, according to a selection protocol. Evaluating device 404 may determine a confidence level in selection protocol, according to any process suitable for determination of a confidence level in a protocol as described above. Evaluating device 404 may determine a confidence level in at least an enforcement device according to any process for determination of a confidence level in cryptographic evaluator as described above. In an embodiment, at least an enforcement device may be a verified device, and/or may be listed in verified device registry 452, which may be implemented without limitation as described in disclosures incorporated herein by reference. At least an enforcement device may, as a non-limiting example, be incorporated into a protocol exercised in a network implementing second temporally sequential listing. As a non-limiting example, protocol may require a digital signature by at least an enforcement device indicating either a successful transfer in second digitally sequential listing or a lack of success. Protocol may, for instance, require indication by at least an enforcement device that a corresponding escrowed transfer in first temporally sequential listing has successfully been transferred to a recipient device in first temporally sequential listing, prior to release of item of value to evaluating device 404; protocol may further prevent rescission by a first device that created escrowed transfer except on indication by at least an enforcement device of a failure to transfer to recipient device, resulting in a situation wherein transferor may be assured that evaluating device 404 has made a transfer to transferee prior to release of item of value, while evaluating device 404 may be guaranteed that, upon performing transfer to transferee device, evaluating device 404 will receive item of value. In an embodiment, a transfer to transferee device may also be an escrowed transfer, which may be created and/or enforced according to any protocol, and using any at least an enforcement device, as described above.

Alternatively or additionally, and with continued reference to FIG. 5, escrowed transfer may be enforced using a timeout protocol; a timeout protocol may be a protocol enforced within a network implementing second temporally sequential listing and/or first temporally sequential listing, whereby escrowed transfer expires after passage of a certain period of time. Where subsequent transfers in first temporally sequential listing and/or subsequent temporally sequential listing in reiterations of method 500 and/or method steps as described in further detail below are also escrowed transfers enforced using timeout protocol, a timeout for each such escrowed transfer may be selected to be larger than a timeout for a subsequent escrowed transfer, to allow for clock skew and/or communication delays. Timeout protocol may be enforced by network implementing a given temporally sequential listing such as second temporally sequential listing, first temporally sequential listing, and/or subsequent temporally sequential listings; for instance, whatever protocol is used to authenticate a digitally signed assertion in any such temporally sequential listing may include a protocol whereby upon lapse of a timeout a digitally signed assertion will not be authenticated. Timeout may be calculated using trusted time; for instance, all timeouts may be authenticated using a common source, such as a hash chain, of secure timestamps. In an embodiment, timeout protocol may require that an escrowed transfer will lapse unless a digitally signed assertion from a transferee is entered to indicate a successful transfer; an ultimate transferee, for instance, may receive item of value from evaluating device 404 and/or other intermediary device, and produce a digitally signed receipt, for instance signing an escrowed transfer to ultimate transferee which intermediary device may incorporate in a receipt regarding a previous escrowed transfer (the output of which went into the escrowed transfer to the ultimate recipient), which may in turn include a digital signature of the previous escrowed transfer. The above-described receipt transfer protocol may advance through all escrowed transfers to a first escrowed transfer from an initial transferor. For each escrowed transfer, a receipt entered prior to timeout may make that escrowed transfer valid. As a non-limiting example, where a single transferor is providing item of value to a single transferee, first digitally signed assertion may be a first escrowed transfer with a timeout, and a second digitally signed assertion, which may include any second digitally signed assertion as described in further detail below, may be a second escrowed transfer with a timeout; a transferee device may digitally sign second escrowed transfer prior to its timeout, and/or provide a receipt to an intermediary device which may include without limitation evaluating device 404, and which may in turn sign first digitally signed assertion and/or provide a receipt to transferor device, subsequently receiving item of value. Persons skilled in the art, upon reviewing the entirety of this disclosure, will be aware of various ways in which the above-described protocols, or variations thereon as consistent with the instant disclosure may be performed. Evaluating device 404 may determine a confidence level in a protocol for authentication of escrowed transfers with timeouts in a network implementing second temporally sequential listing and/or other temporally sequential listing, using any process, process step, or combination of processes for evaluation of any authentication protocol as described above.

In an embodiment, and still referring to FIG. 5, assigning confidence level to first digitally signed assertion may solely include assigning a confidence level to a protocol for an escrow transfer; in an alternative embodiment, evaluating device 404 performs one or more steps in a transfer process involving one or more escrowed transfers as descried above instead of method 500, or incorporating one or more steps of method 500 as a part of the escrowed transfer process or protocol. For instance, and without limitation, evaluating device 404 may perform escrowed transfer while authenticating at least an enforcement device by comparing a confidence level in at least an enforcement device, assigned according to any process or process step for assignment of a confidence level to a device as described above, to a threshold; similarly, a confidence level in an escrowed transfer protocol as described above may be comparted to another threshold, and/or an aggregation of confidence level in a transfer protocol and confidence level in an enforcement device, optionally further aggregated with a confidence level in transferor device, may be compared to a threshold. Alternatively or additionally, confidence levels in escrowed transfer protocol, transferor device or devices, and/or at least an enforcement device may be aggregated with or otherwise used to calculate confidence level in first digitally signed assertion, which may include any confidence level determination or determinations as described above. Any combination of any escrowed transfer process, or any portion thereof, with any embodiment of method 500, any other method described herein, or any step or portion thereof, that may occur to any person skilled in the art upon review of the entirety of this disclosure, is contemplated as within the scope of the instant disclosure.

At step 515, and with continued reference to FIG. 5, evaluating device 404 authenticates first digitally signed assertion as a function of the confidence level. Authenticating may include evaluating a digital signature of first digitally singed assertion, for instance using a verification datum as described above; verification datum may be included in an authorization token as described above. Authenticating may include verifying a credential in authorization token, including without limitation verifying a temporal attribute of credential such as without limitation an expiration date and/or currency with regard to expiration date or the like, verifying an access right and/or right to perform a transaction as provided in or with credential, verifying a confidence level provided in credential and/or in authorization token, or any other form of verification of credential and/or authorization token as described in this disclosure. Authenticating first digitally signed assertion may comprise calculating a confidence level of the at least a first cryptographic evaluator associated with the second temporally sequential listing and authenticating the first digitally signed assertion as a function of the confidence level. As a non-limiting example authenticating the first digitally signed assertion may involve determining an aggregate confidence level of the plurality of confidence levels derived as described above and authenticating the first digitally signed assertion as a function of the aggregate confidence level.

With continued reference to FIG. 5, authentication of the first digitally signed assertion by the evaluating device may be performed in a plurality of ways. As described above, authentication may be implemented in a blockchain setting where digital signatures are evaluated in a multitude of ways, such as: verifying that the signatures are associated with a specific person, device, or address, ensuring the signature has not been used elsewhere (i.e. double-spending), and/or ensuring the block was formed correctly, among other aspects. Authentication may also be implemented in a blockchain setting where a calculated confidence level of a digitally signed assertion is itself the authentication, which as described above may involve calculating the confidence level of multiple aspects of a digitally signed assertion: the digitally signed assertion itself, the temporally sequential listing containing the associated digitally signed assertion, and/or one or more cryptographic evaluators, among other aspects. Individual or aggregate confidence levels may then be used to determine authenticity. Another non-limiting example of authentication may involve calculation of a confidence level as described previously and comparing the result to a threshold, as described above. In a blockchain, transactions flagged as needing a higher level of security (i.e. large sums of money, credit card information, medical records, etc.) may have a higher threshold than those transactions deemed to need less security (i.e. smaller sums of money, data lacking personal information, etc.). Another non-limiting example of authenticating a digitally signed assertion may also involve calculation of a confidence level, but where the calculated confidence level is posted to the participating blockchain upon which participants of the network decide the authenticity and fate of the transaction; similar processes described above. All of the mentioned authentication protocols may be used individually or in cohort.

At step 520, and with continued reference to FIG. 5, evaluating device generates a second digitally signed assertion as a function of first digitally signed assertion. Generating second digitally signed assertion may include selecting data from first digitally signed assertion. Generating second digitally signed assertion may include verifying that selected data from the first digitally signed assertion has been authenticated. Generating second digitally signed assertion may include replicating authenticated data from the first digitally signed assertion. Generating second digitally signed assertion may include and creating a second digitally signed assertion as a function of data from the first digitally signed assertion. Selection of data may be from a plurality of information as described below.

With continued reference to FIG. 5, digitally signed assertion 428 may be generated by evaluating device 404 as a function of first digitally signed assertion 412. Second digitally signed assertion 428 may include data from first digitally signed assertion 412. Second digitally signed assertion 428 may include a reference or link to first digitally signed assertion 412, including without limitation a cryptographic hash of first dataset, a root of a hash tree, Merkle tree, or the like including first dataset, a uniform resource locator (URL) referring to a location containing first dataset, or the like. First digitally signed assertion 412 may include a first proof of authenticity. Second digitally signed assertion 428 may include verification information to verify first proof of authenticity from first digitally signed assertion 412; for instance, where first proof of authenticity includes a digital signature generated using a private key of a public key cryptographic system, first digitally signed assertion 412 may include a corresponding public key. Similarly, where first proof of authenticity includes a zero-knowledge proof, first digitally signed assertion 412 may include verification data useable to verify zero-knowledge proof. In an embodiment, second digitally signed assertion 428 may include at least a second proof of authenticity derived from the first proof of authenticity; at least a second proof of authenticity may include, as a non-limiting example, an attested timestamp, a digital signature or zero-knowledge proof generated by a second evaluating device 404 and/or other party, or the like. In an embodiment, second digitally signed assertion 428 may be any escrowed transfer as described above; where escrowed transfer is a timeout-based escrowed transfer as described above, evaluating device 404 may compute and enter a timeout as part of escrowed transfer, where timeout may be computed from a secure timestamp, and may be calculated as less than a timeout entered regarding first digitally signed assertion.

Still referring to FIG. 5 digitally signed assertion 428 may include an authorization token, which may include any authorization token as described in U.S. Nonprovisional application Ser. No. 16/681,750, filed on Nov. 12, 2019, and entitled "SYSTEMS AND METHODS FOR DISTRIBUTED KEY STORAGE," the entirety of which is incorporated herein by reference. Authorization token may be implemented as and/or include a security assertion markup language (SAML) token. Authorization token may be stored as and/or include information stored as and/or according to an attribute-based credential (ABC) and/or a plurality thereof, including without limitation privacy-preserving ABC. Tokens, digitally signed assertions, chains of attestation, and/or any other authentication and/or authorization decisions and/or other data and/or data structures evaluated and/or created according to any process described in this disclosure may be stored in and/or indexed by a library, which any device participating in and/or performing any action described in this disclosure may utilize to verify authentication, authorization, identification, chains of trust, and/or attestation chains.

At step 525 and still referring to FIG. 5, evaluating device enters the second digitally signed assertion in at least an instance of a first temporally sequential listing; this may be implemented in any manner described above for entering a digitally signed assertion in a temporal sequential listing in reference to FIGS. 1-3. Entering second digitally signed assertion into an instance of the first temporally sequential listing may comprise identifying a currently active sub-listing of the first temporally sequential listing. Identifying the currently active sub-listing of the first temporally sequential listing may also comprise authenticating the active sub-listing; authentication of currently active sublisting may be performed according to any process as described above in reference to FIG. 2 for authentication of a currently active sublisting in a temporally sequential listing.

With continued reference to FIG. 5, evaluating device 404 may enter second digitally signed assertion 428 in at least an instance directly; for instance, evaluating device 404 may have a local copy of first temporally sequential listing 424 and/or a local copy of a sub-listing within first temporally sequential listing 424, such as without limitation a partially completed or otherwise recent block in a blockchain. Alternatively or additionally evaluating device 404 may transmit second digitally signed assertion 428 to one or more remote devices that may enter second digitally signed assertion 428 in at least an instance of first temporally sequential listing 424.

Still referring to FIG. 5, where second digitally signed assertion 428 is an escrowed assertion as described above, evaluating device 404 may receive, from a transferee device, a receipt or other indication of transfer of an item of value; where at least an enforcement device is implementing an escrowed transfer protocol in first temporally sequential listing, at least an enforcement device may digitally sign second digitally signed assertion 428 indicating transfer, or may otherwise provide information to, e.g., network implementing second temporally sequential listing to indicate successful transfer and release transfer of escrowed transfer in first digitally signed assertion.

In an embodiment, and continuing to refer to FIG. 5, evaluating device 404 may determine a confidence level in first temporally sequential listing and/or a current block of temporally sequential listing, using any process, process step, or combination thereof as described above for determination of a confidence level in second temporally sequential listing, protocols for implementation thereof, assumptions regarding such protocols, and/or compliance with protocols and/or assumptions, whether protocols pertain to authentication of digitally signed assertions, sublistings or both; confidence level may be compared to any threshold as described above, and entry in first temporally sequential listing may be performed only upon matching or exceeding the threshold. In an embodiment, where first digitally signed assertion includes a transfer of an item of value, evaluating device 404 may reproduce the transfer in first temporally sequential listing, for instance in the form of second digitally signed assertion, which may reference a transferee listed in first digitally signed assertion; that is, first digitally signed assertion may identify transferee according to any protocol described above for identification of a device, and second digitally signed assertion may similarly identify the same device as transferee, such that transferee may "spend" item of value with a subsequent transfer in first temporally sequential listing. Second digitally signed assertion may refer to first digitally signed assertion and/or second temporally sequential listing, so that devices evaluating a subsequent expenditure of item of value may include, in authentication, an inspection of second temporally sequential listing to avoid double-spending; where second temporally sequential listing has been assigned a high confidence level as described above, devices authenticating subsequent expenditure may assign a high confidence level to subsequent entries in second temporally sequential listing as well. Alternatively, second digitally signed assertion may itself transfer item of value to an additional device; transferee in first digitally signed assertion may, for instance, be identified using any process, step of process, or combination of processes for device identification as described above, such that second digitally signed assertion may be used for an immediate expenditure thereof to a second transferee, for example by reception by evaluating device of a digital signature from first transferee of a transfer to second transferee. Evaluating device may alternatively be first transferee. This approach may obviate the need for escrowed transfers, as identification of devices across networks and/or temporally sequential listings may allow direct expenditure between temporally sequential listings as described above.

Still viewing FIG. 5, evaluating device 404 and/or another cryptographic evaluator may enter a third digitally signed assertion in second temporally sequential listing identifying second digitally signed assertion and/or first temporally sequential listing; such third digitally signed assertion may either indicate that an item of value in first digitally signed assertion has been "spent" via entry of second digitally signed assertion, or that second digitally signed assertion has given a transferee ability to form additional digitally signed assertions in first temporally sequential listing, so that, for instance, devices authenticating an expenditure in second temporally sequential listing are able to check for double spending in first temporally sequential listing as described above. This process may include determination of confidence level in first temporally sequential listing, which may depend or be calculated based on such determination by evaluating device 404.

Continuing to refer to FIG. 5, any step or embodiment of any method, including without limitation method 500, may be repeated and/or combined in any combination, for instance with respect to a third, fourth, or subsequent temporally sequential listing, wherein any temporally sequential listing may act either in a capacity as second temporally sequential listing and/or first temporally sequential listing for any given step as described above, and any digitally signed assertion may act in capacity of first, second, and/or third digitally signed assertion in any iteration or combination of steps of any method as disclosed herein.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
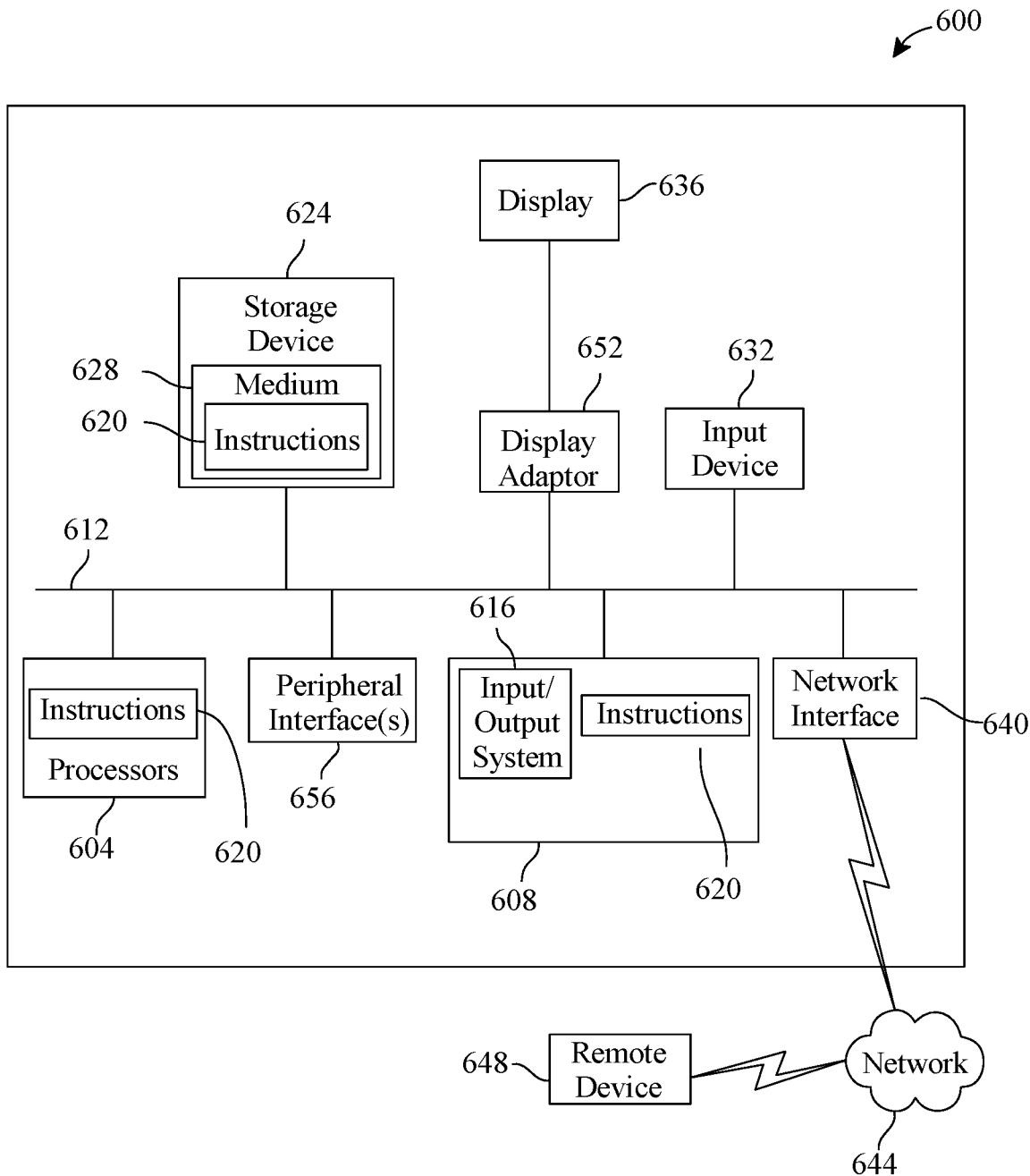
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for importing a digitally signed assertion to a temporally sequential listing, the method comprising:
   receiving, by an evaluating device, at least a communication including a first digitally signed assertion, wherein the first digitally signed assertion is contained within a second temporally sequential listing;
   assigning, by the evaluating device, a confidence level to the first digitally signed assertion, wherein assigning the confidence level to the first digitally signed assertion further comprises assigning a confidence level to the second temporally sequential listing;
   authenticating, by the evaluating device, the first digitally signed assertion as a function of the confidence level;
   generating, by the evaluating device, a second digitally signed assertion as a function of the first digitally signed assertion; and
   entering, by the evaluating device, the second digitally signed assertion in at least an instance of a first temporally sequential listing.

2. The method of claim 1, wherein assigning the at least a confidence level further comprises:
   evaluating a third digitally signed assertion assigning a recorded confidence level to a cryptographic evaluator of the at least a first cryptographic evaluator; and
   assigning the confidence level as a function of the recorded confidence level.

3. The method of claim 1, wherein assigning the confidence level to the second temporally sequential listing further comprises receiving a consensus evaluation of the at least a confidence level from a network of cryptographic evaluators.

4. The method of claim 1, wherein assigning the confidence level to the second temporally sequential listing further comprises:
   evaluating at least an assertion in the second temporally sequential listing; determining at least a confidence level of one of more cryptographic evaluators of a plurality of cryptographic evaluators digitally signing the at least an assertion; aggregating the confidence levels of the one or more cryptographic evaluators to generate an aggregate confidence level; and calculating the confidence level of the first digitally signed assertion as a function of the aggregate confidence level.

5. The method of claim 1, wherein assigning the confidence level comprises:
   receiving, by the evaluating device, an insertion protocol for insertion of a digitally signed assertion in the second temporally sequential listing;
   calculating, by the evaluating device, a confidence level in the insertion protocol; and
   assigning, by the evaluating device, the confidence level in the first digitally signed assertion as a function of the confidence level in the insertion protocol.

6. The method of claim 5, wherein calculating the confidence level in the insertion protocol further comprises;

receiving, by the evaluating device, a degree of compliance for the insertion protocol;
calculating, by the evaluating device, a confidence level in the degree of compliance; and
assigning, by the evaluating device, the confidence level in the insertion protocol as a function of the confidence level in the degree of compliance.

7. The method of claim 5, wherein calculating the confidence level in the insertion protocol further comprises:
receiving, by the evaluating device, an insertion protocol assumption set for the insertion protocol;
calculating, by the evaluating device, a confidence level in the insertion protocol assumption set; and
assigning, by the evaluating device, the confidence level in the insertion protocol as a function of the confidence level in the insertion protocol assumption set.

8. The method of claim 7, wherein calculating the confidence level in the insertion protocol assumption set further comprises:
receiving, by the evaluating device, a degree of compliance for the insertion protocol assumption set;
calculating, by the evaluating device, a confidence level in the degree of compliance; and
assigning, by the evaluating device, the confidence level in the insertion protocol assumption set as a function of the confidence level in the degree of compliance.

9. The method of claim 1, wherein assigning the confidence level comprises:
receiving, by the evaluating device, a generation protocol for generation of a sub-listing in the second temporally sequential listing;
calculating, by the evaluating device, a confidence level in the generation protocol; and
assigning, by the evaluating device, the confidence level in the first digitally signed assertion as a function of the confidence level in the generation protocol.

10. A system for importing a digitally signed assertion to a temporally sequential listing, the system comprising:
an evaluating device, the evaluating device including a processor coupled to a memory, communicatively connected to a network, wherein the evaluating device is designed and configured to receive at least a communication including a first digitally signed assertion, assign a confidence level to the first digitally signed assertion, authenticate the first digitally signed assertion as a function of the confidence level, generate a second digitally signed assertion as a function of the first digitally signed assertion, and enter the second digitally signed assertion in at least an instance of a first temporally sequential listing wherein;
the first digitally signed assertion is contained within a second temporally sequential listing; and assigning the confidence level to the first digitally signed assertion further comprises assigning a confidence level to the second temporally sequential listing.

11. The system of claim 10, wherein the evaluating device is configured to assign the at least a confidence level by:
evaluating a third digitally signed assertion assigning a recorded confidence level to a cryptographic evaluator of the at least a first cryptographic evaluator; and
assigning the confidence level as a function of the recorded confidence level.

12. The system of claim 10, wherein assigning the confidence level to the second temporally sequential listing further comprises receiving a consensus evaluation of the at least a confidence level from a network of cryptographic evaluators.

13. The system of claim 10, wherein assigning the confidence level to the second temporally sequential listing further comprises:
evaluating at least an assertion in the second temporally sequential listing; determining at least a confidence level of one of more cryptographic evaluators of a plurality of cryptographic evaluators digitally signing the at least an assertion; aggregating the confidence levels of the one or more cryptographic evaluators to generate an aggregate confidence level; and calculating the confidence level of the first digitally signed assertion as a function of the aggregate confidence level.

14. The system of claim 10, wherein the evaluating device is further configured to assign the confidence level by:
receiving an insertion protocol for insertion of a digitally signed assertion in the second temporally sequential listing;
calculating a confidence level in the insertion protocol; and
assigning the confidence level in the first digitally signed assertion as a function of the confidence level in the insertion protocol.

15. The system of claim 14, wherein calculating the confidence level in the insertion protocol further comprises;
receiving a degree of compliance for the insertion protocol;
calculating a confidence level in the degree of compliance; and
assigning the confidence level in the insertion protocol as a function of the confidence level in the degree of compliance.

16. The system of claim 14, wherein calculating the confidence level in the insertion protocol further comprises:
receiving an insertion protocol assumption set for the insertion protocol;
calculating a confidence level in the insertion protocol assumption set; and
assigning the confidence level in the insertion protocol as a function of the confidence level in the insertion protocol assumption set.

17. The system of claim 16, wherein calculating the confidence level in the insertion protocol assumption set further comprises:
receiving a degree of compliance for the insertion protocol assumption set;
calculating a confidence level in the degree of compliance; and
assigning the confidence level in the insertion protocol assumption set as a function of the confidence level in the degree of compliance.

18. The system of claim 11, wherein the evaluating device is configured to assign the confidence level by:
receiving a generation protocol for generation of a sub-listing in the second temporally sequential listing;
calculating a confidence level in the generation protocol; and
assigning the confidence level in the first digitally signed assertion as a function of the confidence level in the generation protocol.

* * * * *